United States Patent
Hunt et al.

[19]

[11] Patent Number: 6,112,276
[45] Date of Patent: Aug. 29, 2000

[54] MODULAR DISK MEMORY APPARATUS WITH HIGH TRANSFER RATE

[75] Inventors: Tom Hunt, Corona; Raymond William Hall; David Thomas Ratter, both of Riverside, all of Calif.

[73] Assignee: Signatec, Inc., Corona, Calif.

[21] Appl. No.: 08/949,102

[22] Filed: Oct. 10, 1997

[51] Int. Cl.[7] .................................................. G06F 13/12
[52] U.S. Cl. ............................................................. 711/112
[58] Field of Search ........................... 711/111, 112, 114

[56] References Cited

U.S. PATENT DOCUMENTS

| 5,398,158 | 3/1995 | Fisher et al. ............................. 361/685 |
| 5,812,754 | 9/1998 | Lui et al. ............................. 395/182.04 |
| 5,889,795 | 3/1999 | Niijima et al. .......................... 714/766 |

*Primary Examiner*—Eddie P. Chan
*Assistant Examiner*—Kevin L. Ellis
*Attorney, Agent, or Firm*—William L. Chapin

[57] ABSTRACT

A modular disk memory apparatus provides a modularly expandable, multi-gigabyte auxiliary memory for a computer or other host electronic device, and includes multiple, parallel serial data channels to maximize bidirectional data transfer rates between the apparatus and the host device. Maximization of READ/WRITE data transfer rates within the apparatus is achieved by utilizing a large number of small hard disk drives, typically eight 2.5-inch drives on each of a plurality of Disk Storage Modules, each including a plug-in printed circuit board capable of holding two 5-¼ inch drives, thereby increasing the maximum data transfer rate per unit volume of the modules by a factor of two. Maximization of bidirectional data transfer rates between the apparatus and host device over that attainable using a single serial data channel such as a coaxial, quadaxial or fiber optic cable, is achieved by parsing or demultiplexing data to be transmitted from a single parallel channel onto p paralleled cables, thereby increasing the maximum transmittal rate by p. Data received over the parallel data channels is multiplexed or concatenated to comprise a data stream on a single parallel channel. Reconstruction data is embedded in data contained in the p parallel data channels specifying the number q of channels employed, where $1 \leq q \leq p$ thereby configuring the demultiplexer to concatenate that number of data channels onto a single parallel data bus.

20 Claims, 19 Drawing Sheets

FIGURE 2 - Prior Art, A Typical VME Disk Drive Module

MODULAR DISK MEMORY APPARATUS WITH HIGH TRANSFER RATE

BACKGROUND OF THE INVENTION

A. Field of the Invention

The present invention relates to electronic data storage devices. More particularly, the invention relates to a modular disk memory apparatus which employs a plurality of small disk drives, control electronics, and software functionally interconnected in a manner which optimizes sustained rates of data transfer per unit volume of the apparatus.

B. Description of Background Art

A substantial variety of applications exist for high capacity electronic digital storage devices. While memory capacities of one megabyte (1 million 8-bit words or bytes) were considered to be relatively large only a few years ago, many small personal computers (PC's) now have memory capacities of two gigabytes (two thousand-million bytes) or larger.

Most general purpose work stations, PC's and network computers use one or more hard disk drives for storing large blocks of data. Hard disks are magnetic memory devices which each have a data storage capacity of up to about six gigabytes, and a relatively high data transfer rate. A typical hard disk drive consists essentially of a thin, relatively inflexible disk rotating at high speed, having a diameter of about 5 inches and coated with a ferromagnetic material having tiny domains magnetizable in either of two directions to record digital data as a series of "ones" or zeros" in circular-tracks on the disk.

For certain applications requiring large blocks of data to be transferred at high rates, existing PC-type hard disk memories are inadequate. One solution to the problem of providing large data storage capacities is to employ a plurality of functionally interconnected, small, relatively inexpensive disk drives. To allow for the possibility that, on occasion, one or more of such drives will malfunction, temporarily experience defects in one or more data storage tracks, or fail entirely, the architecture of large capacity disk memory storage units often incorporates one or more levels of redundancy. Thus, such high capacity data storage units usually employ at least one dedicated disk drive that performs a parity checking or back-up data storage function. The dedicated disk drive provides a capability of reconstructing data which may be lost because of a defect or malfunction in one of the disk drives. Because of this redundancy function, a data storage device of this type is sometimes referred to as a RAID (Redundant Array of Inexpensive Disks).

A variety of data storage devices employing a plurality of disk drives, some of such devices configuring the disk drives in a RAID type of array, are disclosed in the following U.S. patents:

Crater et al., U.S. Pat. No. 5,146,580, Sep. 8, 1992, Redundancy Accumulator For Disk Drive Array Memory: Discloses a data storage subsystem that uses a large plurality of small form-factor disk drives (typically 5¼ inch) to implement an inexpensive, high performance, high reliability disk drive memory that emulates the format and capability of large form-factor disk drives. The data transmitted by the associated computer system is used to generate redundancy information which is written with the data across N+M disk drives in a redundancy group in the data storage subsystem.

Hotle, U.S. Pat. No. 5,218,689, Jun. 8, 1993, Single Disk Emulation Interface For An Array Of Asynchronously Operating Disk Drives: Discloses a multiple disk drive array storage device that emulates the operation of a single disk drive. The array storage device includes a large buffer memory and a plurality of asynchronously-operating disk drives (typically 14-inch diameter).

Rudeseal et al., U.S. Pat. No. 5,239,659, Aug. 24, 1993, Phantom Duplex Copy Group Apparatus For A Disk Drive Array Data Storage Subsystem: Discloses an apparatus that uses a disk drive array to store data records for an associated host processor. This disk drive array emulates the operation of a large form factor disk drive by using a plurality of interconnected small form factor disk drives. These small form factor disk drives are configured into at least two redundancy groups, each of which contains n+m disk drives for storing data records and redundancy information thereof.

Fisher et al., U.S. Pat. No. 5,398,158, Mar. 14, 1995, Multiple Disk Drive Module With Standard Form Factor: Discloses a disk drive module which externally has the physical and electrical appearance of a single standard 5.25 inch disk drive, but which internally contains five 2.5 inch disk drives and the electronics for operating them as resilient disk array. Each of the disk drives is mounted on a separate printed circuit board which extends substantially the full length of the module.

Hao et al., U.S. Pat. No. 5,412,661, May 2, 1995, Two-Dimensional Disk Array: Discloses a data storage system architecture having an array of small data storage disks, organized into logical rows and columns, with each disk coupled to two disk controllers via two independent controller-disk interconnects.

Nunnelley et al., U.S. Pat. No. 5,423,046, Jun. 6, 1995, High Capacity Data Storage System Using Disk Array: Discloses a data storage and retrieval system which has extremely high capacity. The system includes a large array of small disk files, and three storage managers for controlling the allocation of data to the array, access to data, and the power status of disk files within the array.

Blair et al., U.S. Pat. No. 5,539,660, Jul. 23, 1996, Multi-Channel Common-Pool Distributed Data Storage And Retrieval System: Discloses a system that includes a plurality of disk arrays for storing, sequentially, contiguous segments of a data block. In the case of movies, each segment includes, for example, a few seconds of each relevant movie. An electronic commutator sequentially connects the disk arrays to a corresponding plurality of access channels.

Baba, U.S. Pat. No. 5,544,339, Aug. 6, 1996, Array Of Disk Drives With Redundant Channels: Discloses an array of disk drives that stores information which is accessed through multiple channels by a host computer. Different channels are coupled to different sequences of disk drives. Different disk drives can be accessed simultaneously through different channels, enabling high data transfer rates.

Matsumoto et al., U.S. Pat. No. 5,517,632, May 14, 1996, Redundant Array Of Disks With Improved Storage And Recovery Speed: Discloses a redundant array of disks in which the disks are divided into areas of different sizes, so that small amounts of data can be stored in an area of an appropriate size on a single disk, instead of being spread over multiple disks. A usage status table indicates which areas are in use.

The above-listed references are directed generally to architectures which utilize a plurality of disk drive memories to achieve high data storage capacities, with the goal of some of the devices to also possess high data transfer rates. However, existing large capacity data storage units, particularly those employing a RAID architecture, have certain limitations. In particular, most such devices are capable of transferring data at high rates only in short, interrupted, bursts. Also, presently existing data storage units are relatively large. These limitations are disadvantageous for a variety of applications, including high speed data acquisition, high performance work stations or networking, digital video and movies, weather prediction, oil prospecting and seismic measurements, and satellite communications. The present invention was conceived of to provide a modular data storage apparatus having a high modularly selectable data storage capacity, very high sustained, absolute data transfer rates, and data transfer rates that are maximized per unit volume of the apparatus.

OBJECTS OF THE INVENTION

An object of the present invention is to provide a modular data storage apparatus capable of transferring data at high, sustained rates.

Another object of the invention is to provide a modular data storage unit having one or more data storage modules each including a circuit board on which are mounted a plurality of disk drive memory units.

Another object of the invention is to provide a modular high capacity data storage unit which achieves high sustained data transfer rates per unit volume.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, we do not intend that the scope of our exclusive rights and privileges in the invention be limited to details of the embodiments described. We do intend that equivalents, adaptations and modifications of the invention reasonably inferable from the description contained herein be included within the scope of the invention as defined by the appended claims.

SUMMARY OF THE INVENTION

Briefly stated, the present invention comprehends a modular data storage apparatus having a high data storage capacity, the apparatus being capable of transferring data at high sustained rates, both in receiving (WRITE) and transmitting (READ) modes. The modular data storage apparatus according to the present invention includes at least one and preferably a plurality of disk storage modules (DSM's), each consisting of a printed circuit board on which are mounted a plurality of miniature magnetic hard-disk drive memory units, and associated electronic components and circuitry. The data storage apparatus according to the present invention also includes a Disk Controller Module (DCM), and a System Interface Module (SIM). Preferably each of the latter modules consists of a single printed circuit board which plugs into connectors in an enclosure which also contains connectors for at least one but preferably up to 19 DSMs. In a typical embodiment of a modular data storage apparatus according to the present invention, eight 2.5" hard disk drives are mounted on one side of a standard format printed circuit board, such as a VME board, with electronic components mounted on the opposite side of the board. According to the present invention, the DCM, SIM, and each of the DSM's has mounted on board its own microprocessor, for controlling on-board functions and for receiving signals from and transmitting signals to other modules in the apparatus. Preferably, the DCM has one on-board disk drive, which may store system control programs as well as parity data for the various DSM's in the system.

A primary intended application for the modular data storage apparatus according to the present invention is to provide a very high-speed data storage and retrieval capability. The invention is intended for interfacing with a wide variety of high-speed devices, such as high performance networks, video cameras and the like, which devices may include means for interfacing with a host computer system. The data storage apparatus according to the present invention is capable of interfacing (1) directly to various high-speed devices, (2) directly to a host computer, and (3) indirectly, to high-speed devices via a host computer. In the preferred embodiment the apparatus includes a Fibre Channel Interface Board (FCIB) which is installed in a host computer. The FCIB employs a plurality of, typically five, fibre channel ports and a data frame multiplexer/demultiplexer which demultiplexes or parses data from a single data channel for transmission over a plurality of parallel fibre channels. These channels are connected to the SIM located in the modular data storage apparatus, which employs circuitry similar to that of the FCIB to multiplex data received over a plurality of parallel fibre channels onto a single data channel upon reception, to maximize data transfer rates. Optionally, for lower required data transfer rates, the apparatus may be programmed to utilize as few as one fibre channel. According to the present invention, the DCM controls the flow of data from the SIM to each DSM, one block at a time. Each DSM in turn distributes the data blocks to the eight disk drives on that DSM. In reading data stored in the DSM disk drives, the SIM functions in a transmit, demultiplex mode and the FCIB functions in a receive, multiplex mode. The novel architecture and physical configuration of the modular data storage apparatus according to the present invention combine to maximize achievable sustained data transfer rates as a function of hardware volume.

DESCRIPTION OF THE PREFERRED EMBODIMENTS

Figure 1:
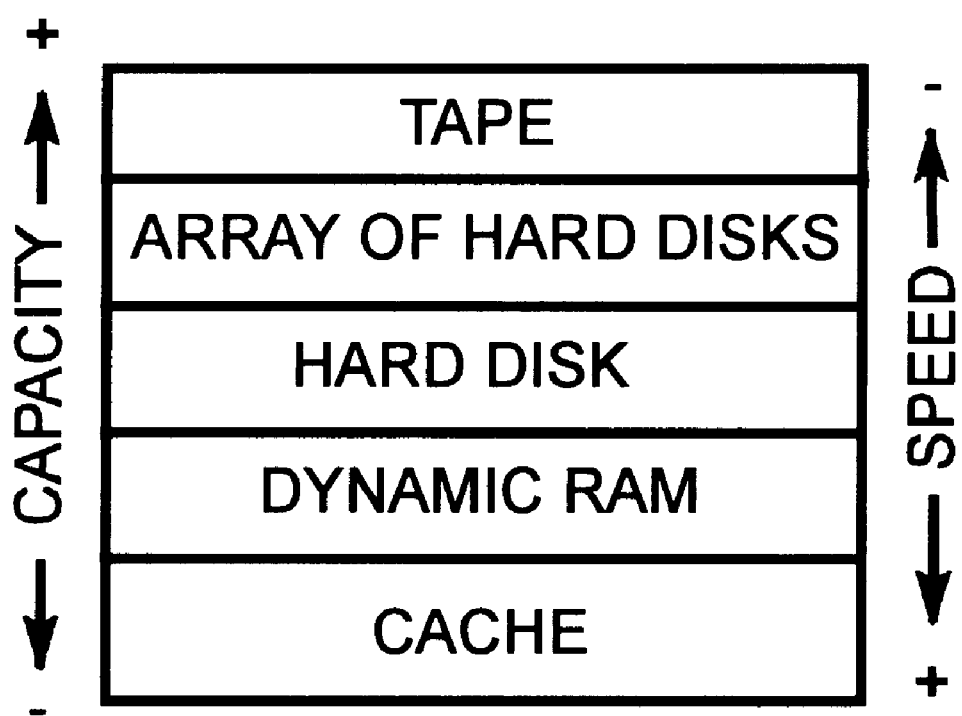
FIG. 1 is a schematic diagram of a typical prior art computer memory hierarchy.
Figure 2:
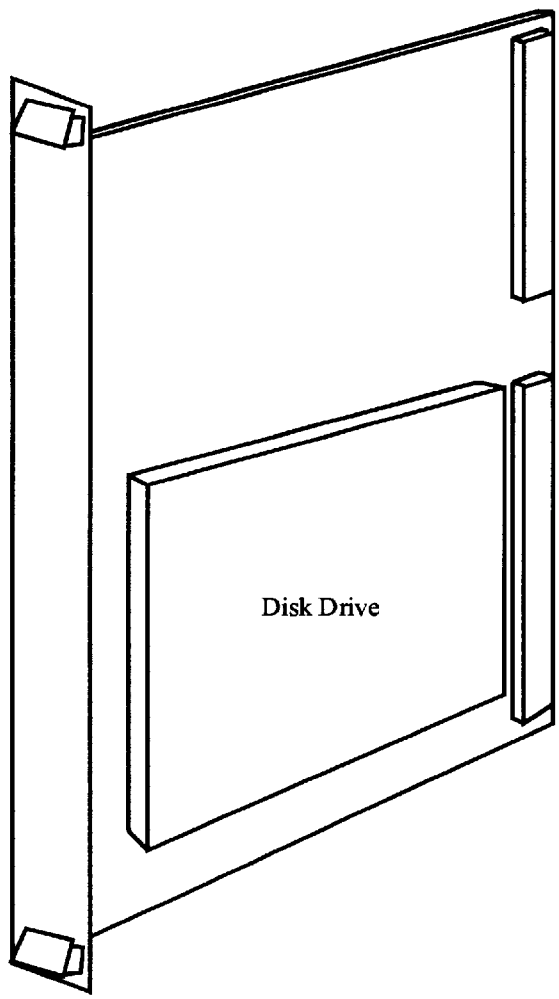
FIG. 2 is a pictorial view of a typical prior art VME disk drive module.

FIGS. 1 and 2 illustrate computer prior art.

FIGS. 3–17 illustrate embodiments of a modular disk memory apparatus including a Data Storage Apparatus (DSU) with high data transfer rate, according to the present invention. The structure and function of that apparatus may be best understood by considering briefly some characteristics of existing computer systems which may interface with the apparatus.

Introduction

Referring first to FIG. 1, a typical hierarchy for the memory system of computers or similar data processing apparatus is shown. Cache and dynamic RAM memory levels of this hierarchy consist of integrated circuits having fast access times and have typical capacities of about a few kilobytes for cache, and up to about 64 megabytes or more for Dynamic RAM. Hard disk drives typically have a capacity of one to six gigabytes.

Most computer systems today incorporate at least the three lower levels of the memory hierarchy shown in FIG. 1. Large computer systems or networks frequently include level 5, a tape back-up storage having high capacity and relatively low speed. Such systems may also include an array of hard disks (Level 4):

Digital memory disks used in computers, whether employing magnetic or optical recording media, typically record data as a string of "one" or "zero" bits in annular ring-shaped tracks on the disk. Assuming the same recording media is used for disks of various sizes, the maximum recordable density of bits per unit area ($\sigma_A$) on disks of various diameters will be the same ($\sigma_A = K_1$). Thus, the number of bits per unit length of track is also a constant ($\sigma_1 = K_2$). The tangential velocity (v) of bits in a track rotating with respect to a fixed read/record head is equal to the product of the angular velocity or rotation rate ($\omega$) of the disk, multiplied by the radius (r) of the track. (v=$\omega$r) Therefore, the maximum bit transfer rate (B) of a disk available in the outermost track is proportional to the radius of the disk. (B=$K_3\sigma_L \omega r$) And, as previously stated, the data storage capacity of a disk platter is proportional to its area, which is in turn proportional to its radius squared. (D=$\sigma_A \Pi r^2$) But the volume of a disk drive is equal to its area (A) times its total thickness (T), which includes the thickness of the disk ($t_d$) plus the thickness of heads ($t_h$) and drive mechanism (T=$t_d+t_h$). Thus, the volume (V) varies at a power at least as great as the square of the radius. (V=$K_4$ [$\Pi\Pi r^2$]) Therefore, the ratio of data transfer rate to volume varies inversely with at least the first power of the radius of a disk. (B/V=$K_3\sigma_L \omega r/K_4[\Pi\Pi r^2]$ 1/r) Thus, for example, a 2.5 inch disk drive will have at least twice the data transfer rate per unit volume as that of a 5.25 inch drive. The present invention exploits the foregoing spatial relationship, and employs a large number of smaller drives in a Parallel Array Of Inexpensive Disks (PAID), thereby maximizing data transfer rate and storage capacity.

The preferred embodiments of the present invention, which maximize hard disk array data storage performance per unit volume of the apparatus, utilize "2.5 inch" disk drives, although it will be clear from the ensuing description that other sizes could be used. Also, as a matter of standardization, modularity, compactness and convenience, example embodiments of a Data Storage Unit (DSU) according to the present invention constructed and described herein use a standard VME bus 6U backplane and chassis. Those skilled in the art will of course recognize that other chassis and/or backplane configurations could also be utilized by the present invention.

VME bus specifications are contained in the ANSI/IEEE STD 1014-1987, IEC 821 and 297 standards. The acronym VME is derived from Versatile Module Eurocard and was first coined in 1981 by a group of manufacturers. The need for a bus and mechanical standard that was microprocessor type-independent and that could be easily expanded or upgraded spawned the VME standards.

The only products known to the present inventors that currently mount disk drives on VME cards, also referred to as circuit boards or modules, are the primary disk drive modules used in VME computer systems, such as "personal" computers (PC's). In PC systems disk drives are mounted in "drive bays" typically consisting of 3 or 4 compartments and are connected to disk drive controllers located on a motherboard or a peripheral card installed in a motherboard slot. In a typical VME system all electronic components of a module are mounted on that module, which plugs into one of the sockets provided in the VME chassis. Therefore, floppy disk drives as well as hard disk drives of a typical VME computer system must be mounted this way.

FIG. 2 shows a typical prior art VME disk drive module. The module contains a floppy disk drive mounted on the upper portion of one side of a printed circuit board, and a hard disk drive mounted on the lower portion of the same side of the board. Although not shown in the figure, the opposite side of the board has electronic components mounted thereon, comprising circuitry for disk drive controller functions.

The type of module shown in FIG. 2 exemplifies a full and complete disk drive system on a VME module, and has no capability for expansion or for use in a larger capacity disk drive system. Moreover, the present inventors are unaware of any existing products implementing arrays of hard disk drives with multiple drives mounted on a single VME module.

OVERVIEW OF THE PREFERRED EMBODIMENTS

Figure 3:
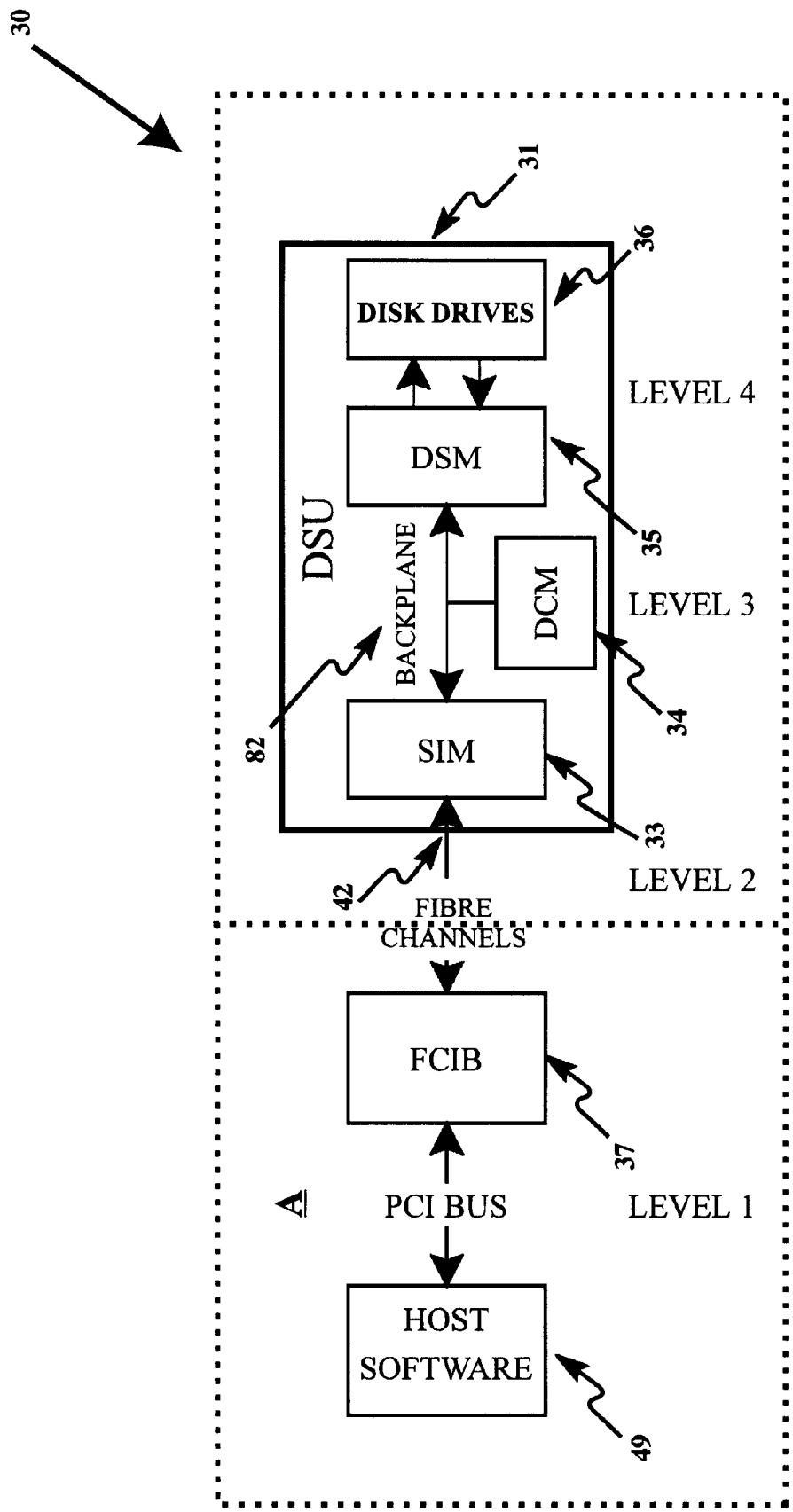
FIG. 3 is a combined system block diagram/data flow diagram of a modular disk memory apparatus or data storage unit (DSU) according to the present invention.
Figure 4:
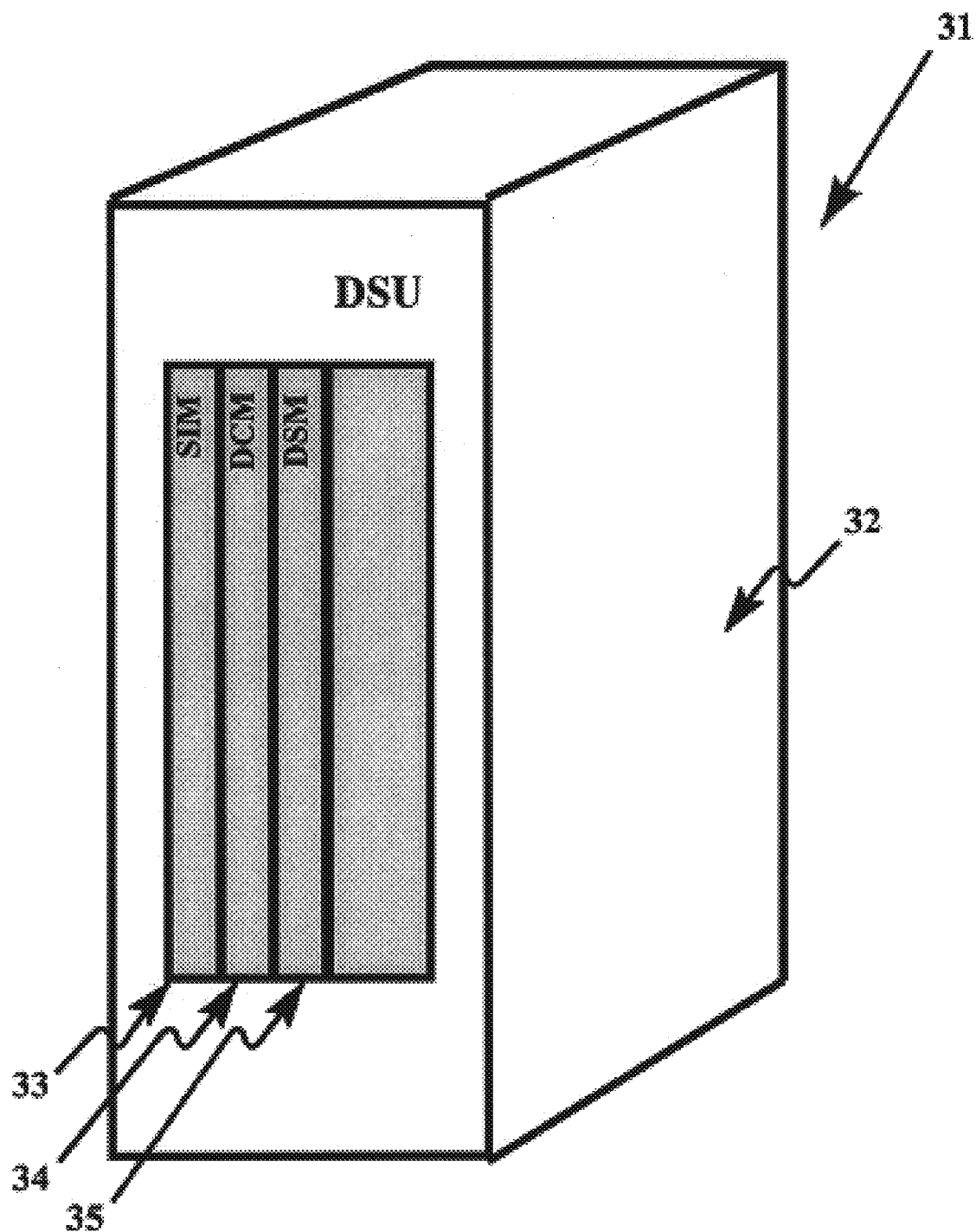
FIG. 4 is a perspective view of a basic embodiment of a modular data storage unit (DSU) according to the present invention.

The modular disk memory apparatus according to the present invention includes a Data Storage Unit (DSU), shown in somewhat diagrammatic form in FIG. 4. In a typical application for the apparatus according to the present invention, the DSU is operationally interconnected with a computer or other data processing apparatus via a fiber channel interface, as shown in FIG. 3. As shown in FIGS. 3 and 4, a basic embodiment of a modular disk memory apparatus (30) according to the present invention includes a Data Storage Unit (DSU) (31). The DSU includes an enclosure (32) housing a VME type chassis having interface connectors and Printed Circuit Board (PCB) connectors into which are plugged PCB modules comprising parts of the apparatus. As shown in FIGS. 3 and 4, a minimum configuration of a DSU (31) includes a System Interface Module (SIM) (33), a Disk Control Module (DCM) (34), and at least one Disk Storage Module (DSM) (35). As will be explained in detail below, each DSM contains a plurality of small-format hard disk drives (36).

As shown in FIG. 3, modular disk memory apparatus 30 according to the present invention includes means for interfacing the apparatus with a data processing apparatus or other host computer such as a PC(A). In the preferred embodiments, high speed data transfer rates are achieved between the PC and DSU (31) by means of a novel Fibre Channel Interface Board (FCIB) (37), which is plugged into a PCI bus card slot of the PC, in conjunction with a SIM (33) in DSU (31). A detailed description of the structure and functions of each of the above-referenced PCB's, and of the overall architecture and functions of modular disk memory apparatus 30 is given below, following the description below of how components of Digital Storage Unit (31) are packaged to achieve high data storing capacities and data transfer rates per unit volume of the DSU (31).

Figure 5:
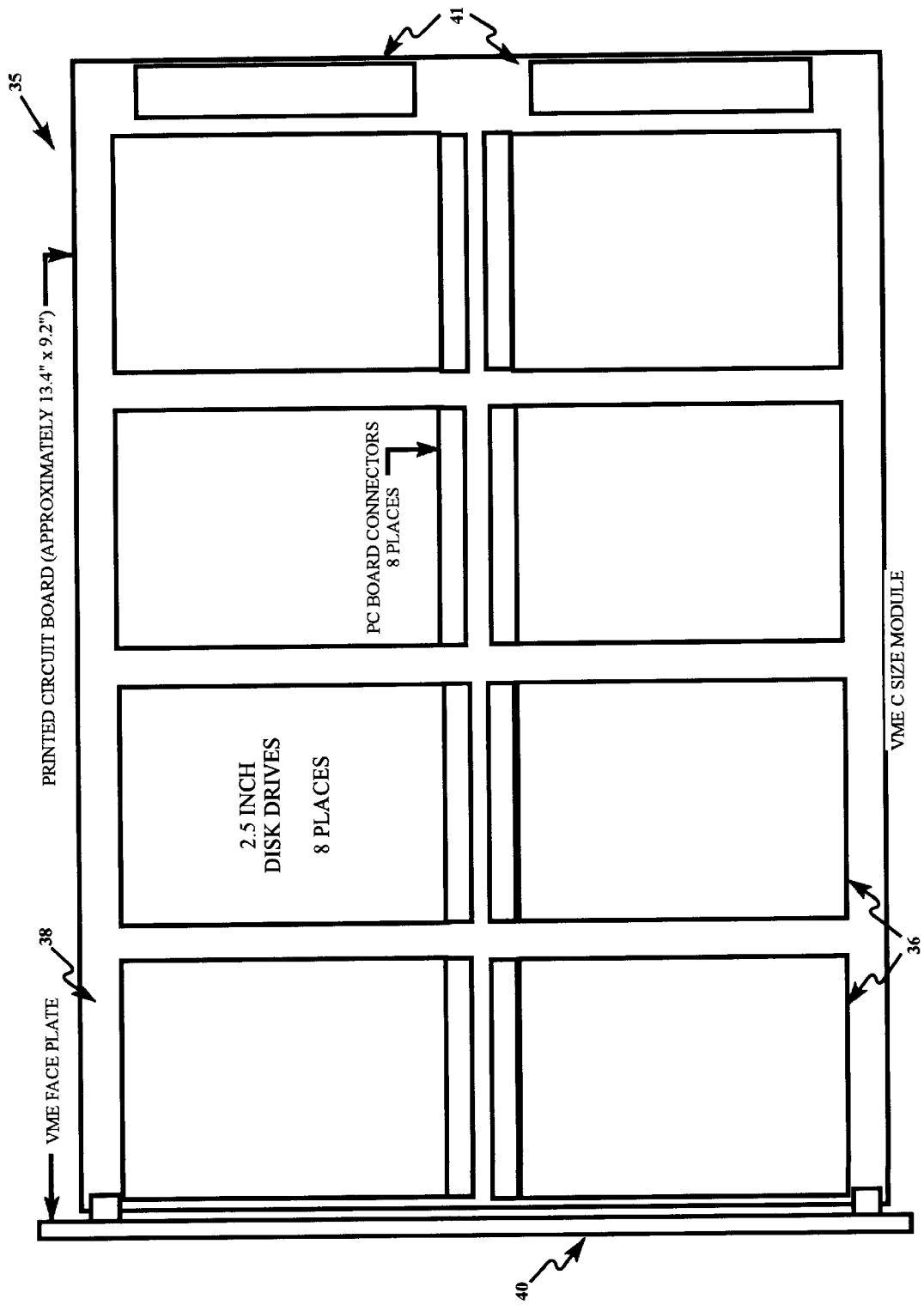
FIG. 5 is an upper plan view of a disk storage module (DSM) comprising one component of the apparatus shown in FIG. 4.
Figure 6:
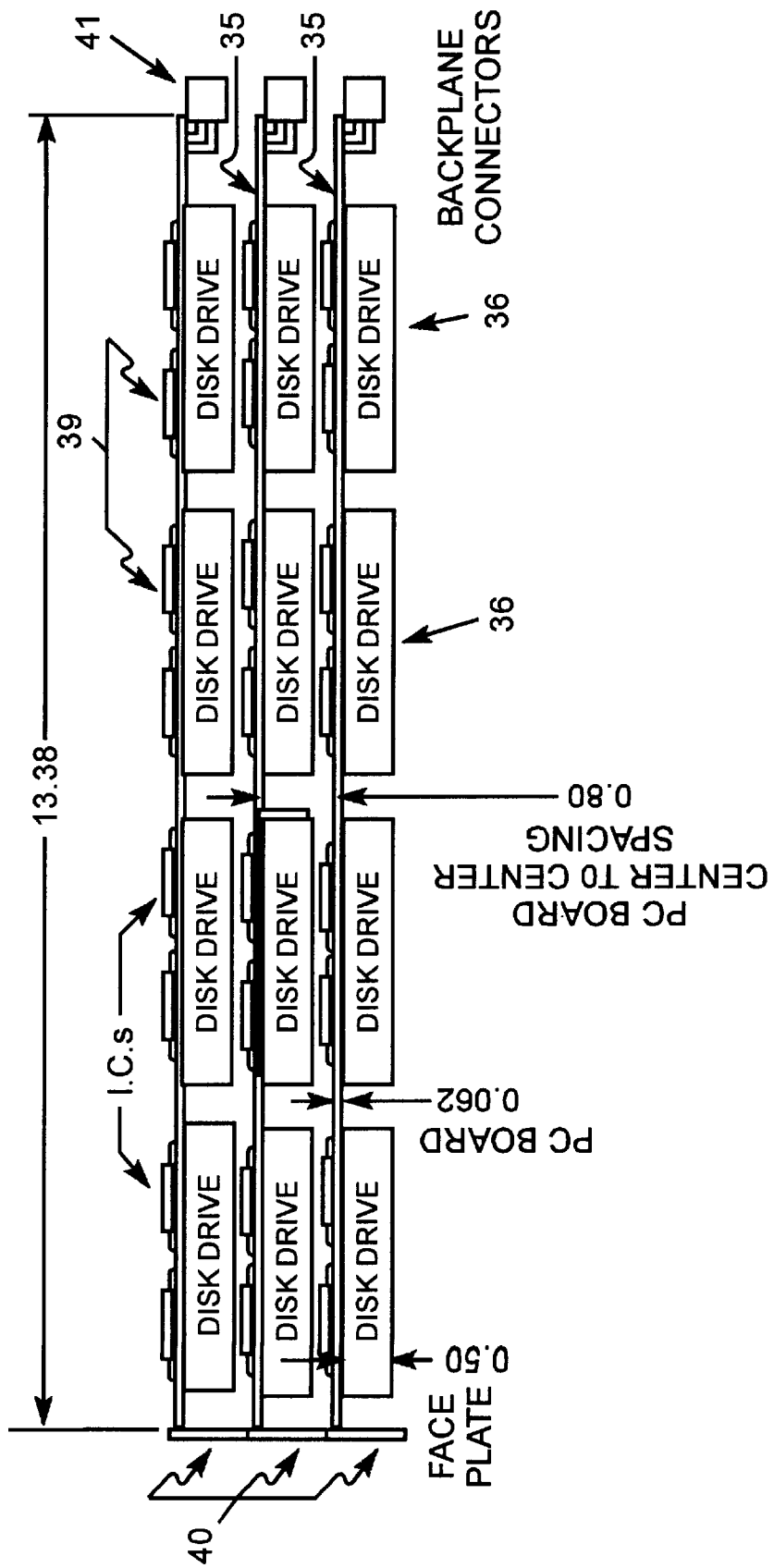
FIG. 6 is a side elevation view of three of the DSM modules of FIG. 5, showing how the modules are located with respect to one another in the apparatus of FIG. 4.
Figure 7:
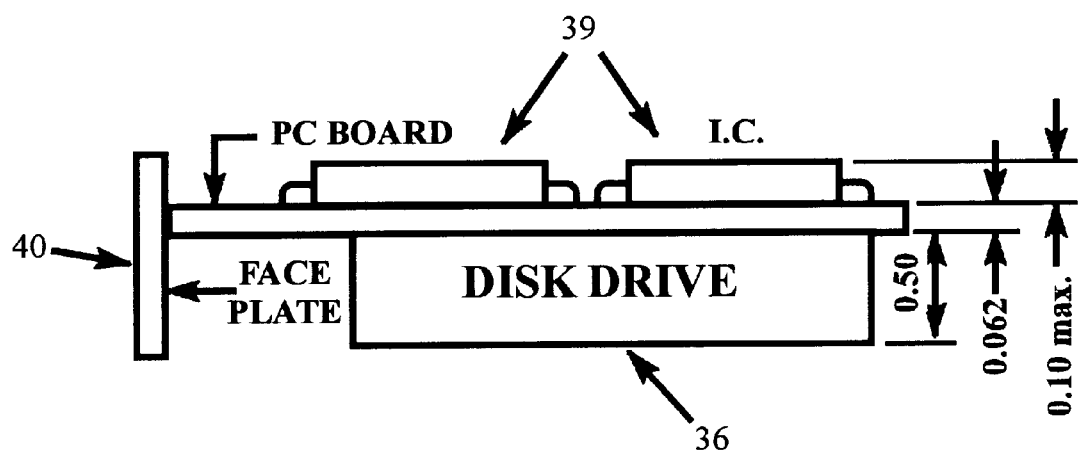
FIG. 7 is a fragmentary side elevation view of the DSM of FIG. 7, on a somewhat enlarged scale.

Referring now to FIG. 5, a Disk Storage Module (DSM) (35), according to the present invention is shown. As shown in FIG. 5, DSM (35) includes a printed circuit board (38), on one side of which are mounted a plurality of, preferably eight, hard disk drives (36). As may be seen best by referring to FIGS. 6 and 7, DSM (35) includes electronic components such as integrated circuits (39) mounted on the side of board (38) opposite from disk drives (36). As shown in FIGS. 5 and 6, each DSM (35) includes a face plate (40) attached transversely and perpendicularly to the front edge of board (38), and one or more connectors (41) attached to the rear edge of the board.

FIG. 6 illustrates the arrangement and spacing in enclosure (32) of a plurality of DSM's (35) that achieves a high density of disk drives (36) per unit volume of the enclosure. As shown in FIG. 6, three DSM's (35) are spaced side by side in close proximity, thereby achieving a density of about 24 disk drives per 295.4 cubic inches. For disk drives having a capacity of 4 gigabytes, the memory density in enclosure (32) is about 96 gigabytes per 295.4 cubic inches, or about 0.33 GB/in$^3$. Disk drives having a higher capacity, 6 gigabytes, for example, would provide DSU (31) with an even higher data storage density. The important point to note is that regardless of the exact value, DSU (31) provides an extremely high data storage density. If, for example, 5¼ inch disk drives were used, rather than the 2½ inch disk drives shown in FIG. 6, four of the larger drives would require the volume occupied by four DSM's. The thickness of each 5¼ inch drive exceeds the standard spacing between two VME modules, thus, each 5¼ inch drive requires two module slots in the chassis. Therefore, four DSM's containing a total of 32 2½ inch disk drives occupies a space that would only accommodate four 5¼ inch drives, resulting in an increased data rate transfer per unit volume for the DSU according to the present invention.

While FIG. 6 shows three DSM's (35) side by side, the spacing of other cards such as the SIM (33) and DCM (34) in enclosure (32) is the same. Thus, the internal form factor for a minimum DSU (31) as shown in FIG. 4, containing one SIM (33), one DCM (34), and one DSM (35) is the same as that of FIG. 6.

The novel architecture and functions of a modular disk memory apparatus (30) according to the present invention may be best described by referring to FIGS. 3 and 8–15, in conjunction with the following description.

Referring first to FIG. 3, it may be seen that according to the present invention, the preferred means of interfacing a Data Storage Unit (DSU) (31) with a computer, such as a PC host computer (A), includes a Fibre Channel Interface Board (FCIB) (37) installed in the host computer. The interfacing means includes a System Interface Module (SIM) (33), resident in DSU (31), and a plurality, preferably two to five, of "fibre channel" data conveying means. Each of the latter may consist of one or more coaxial or quadaxial electrical or fibre optic cables, that meet or exceed the specifications of the standard ANSI X3.230-1994. For lower required data transfer rates, memory apparatus (30) may optionally be programmed to utilize as few as one fibre channel.

Fibre Channel Interface Board (FCIB)

Figure 8:
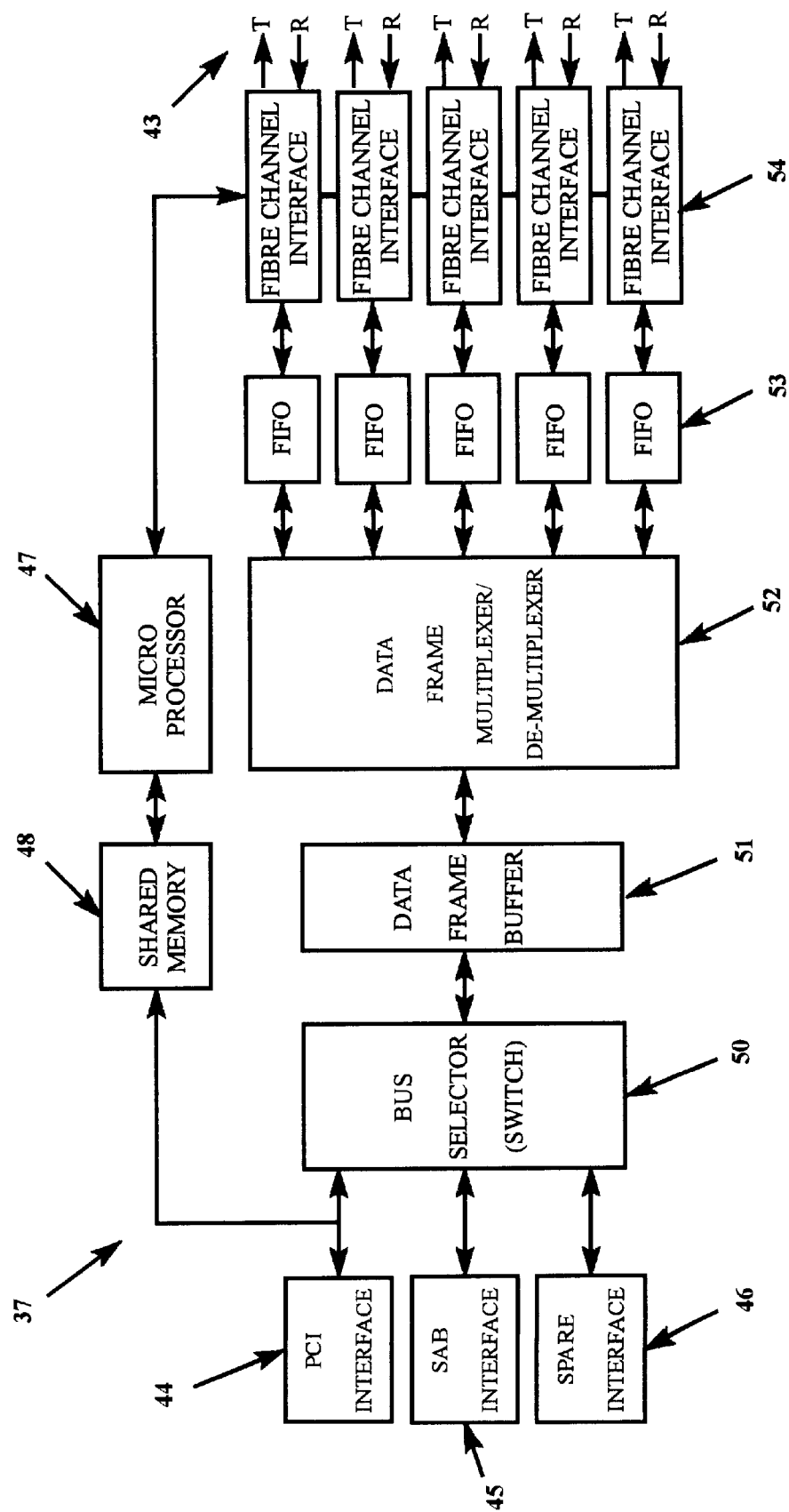
FIG. 8 is a block diagram of a Fiber Channel Interface Board (FCIB) comprising a part of the apparatus of FIG. 4.

Fibre Channel Interface Board (FCIB) (37) is installed in a PCI bus card slot of PC host computer (A), and allows the host computer to transfer commands, such as WRITE or READ FILE, and data between the FCIB and other devices connected to its Fibre Channel (FC) ports (43), as shown in FIG. 8. Thus, FCIB (37) of host computer (A) may be used to interface the host computer with other computers equipped with FCIB's.

As shown in FIG. 8, FCIB (37) has four data interfaces. These include PCI bus interface (44), Signatec Auxiliary Bus (SAB) interface (45), Signatec External Bus (SEB) interface (46), and the previously mentioned FCIB FC ports (43).

Referring still to FIG. 8, it may be seen that FCIB (37) includes a microprocessor (47) and ROM memory containing start-up and Basic Input/Output System (BIOS) instructions. Associated with FCIB microprocessor (47) is additional memory (48), for storing commands specific to operation of FCIB (37) with Data Storage Unit (DSU) (31). Memory (48) may be a portion of the memory of FCIB (37), shared with PC (A), and under control of host software (49) (FIG. 3). FCIB (37) includes a bus selector switch (50) which controls bi-directional data transfer between selected ones of 64-bit wide interface ports (43), (44), (45) and (46), and between a selected one of those interfaces and a data frame buffer (51) via a 64-bit wide port. Data frame buffer (51) in turn is connected to a data frame multiplexer/de-multiplexer module (52) via a 64-bit wide port. Module (52) is in turn connected to a plurality of FIFO's (53), typically two to five, which in turn are connected individually to a separate one of a corresponding number of fibre channel interface receiving/transmitting modules (54), the outputs of which comprise FCIB ports (43).

As will be explained in detail below in conjunction with the timing diagram of FIGS. 12 and 13, an important function of FCIB (37) is to increase the maximum rate of data flow between host computer (A) and DSU (31) over the maximum data transfer rate possible on a single fibre channel. This data transfer rate increase is accomplished by segmenting or parsing a 64-bit wide stream of data into a plurality of partially overlapping frames by the de-multiplexer function of module (52), transmitting the frames over parallel fibre channels, and re-assembling the plurality of frames into a single 64-bit wide data stream by the multiplexer function of a multiplexer/de-multiplexer module located in SIM module (33) and corresponding to module (52).

To perform the foregoing and other functions, commands are given to microprocessor (47) of FCIB (37) by first placing the commands into shared memory (48). Microprocessor (47), in turn retrieves and decodes commands and issues necessary instructions to accomplish the commands. The instructions include those required to access external devices connected to FCIB (37), initialize and prepare particular data interfaces via bus selection switch (50), and control data frame circuitry and FC ports (43) for data transfers. The balance of the circuitry on FCIB (37), i.e., Bus Selector Switch (50), Data Frame Buffer (51), Data Frame Multiplexer/De-multiplexer (52), and FIFO's (53), are operably interconnected to effect high-speed transfer of data between any two of the interfaces (43), (44), (45) and (46), with minimal intervention of microprocessor (47) after initial set-up is performed.

System Interface Module (SIM)

As shown in FIG. 3, Data Storage Unit (31) includes a System Interface Module (33) which is connected to FCIB (37) by a plurality of fibre channel cables (42). The function of SIM (33) is to translate commands and data transmitted from the FCIB or an external device such as host computer (A) to the format required by Disk Control Module (DCM) (34). Since different computers or other such external devices which DSU (31) is intended to be used with typically have different interface requirements, SIM (33) is constructed as a separate module which may be customized to readily adapt DSU (31) to a particular interface protocol.

Figure 9:
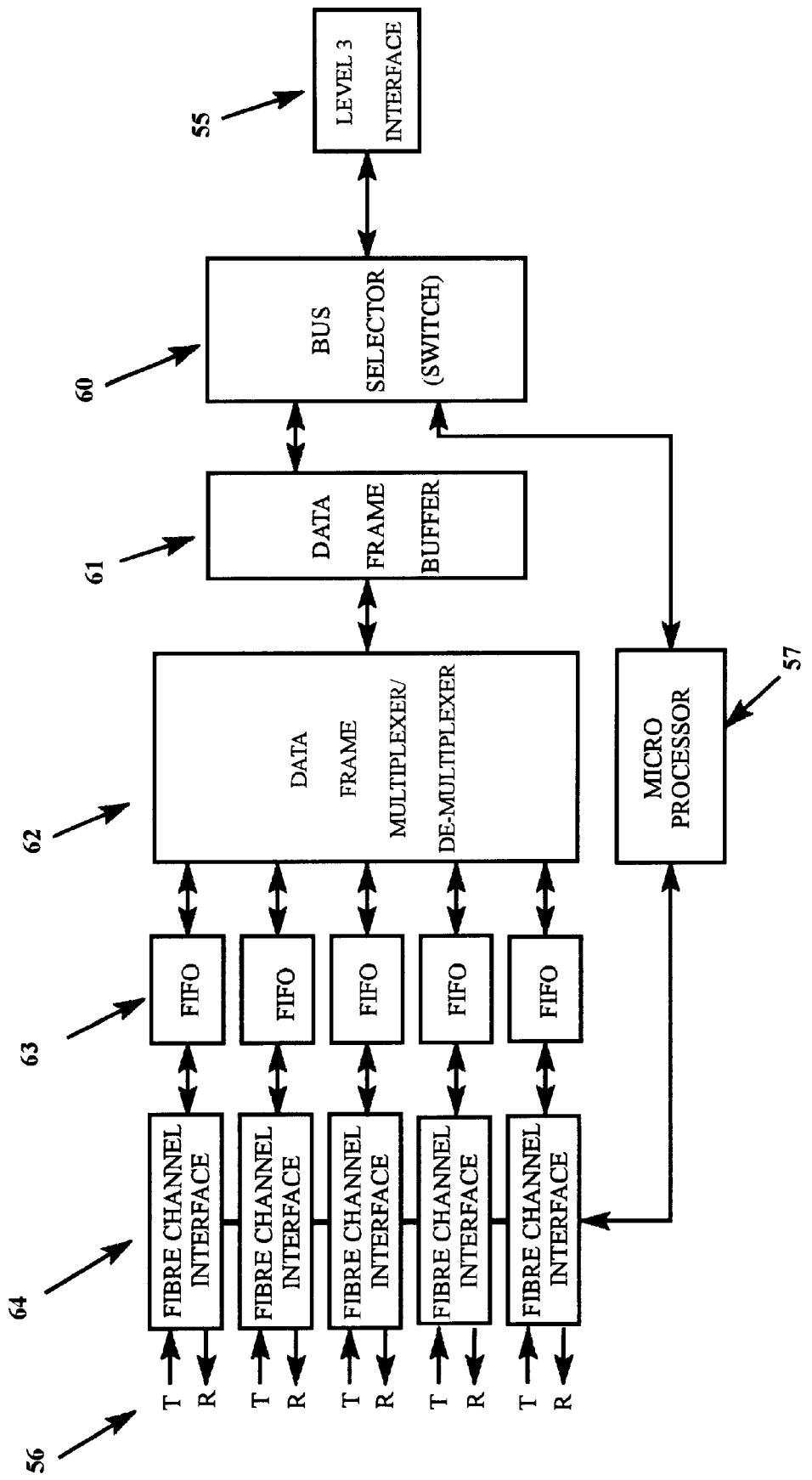
FIG. 9 is a block diagram of a system Interface Module (SIM) comprising a part of the apparatus of FIG. 4.

Referring now to FIG. 9, System Interface Module (SIM) (33) may be seen to be substantially similar in its structure and function to FCIB (37). However, SIM (33) has only two data interface ports, namely a "Level 3" interface port (55) connecting the SIM to the backplane of DSU (31), and Fibre Channel (FC) ports (56). Also, SIM (33) does not automatically set-up data transfer circuitry when the SIM receives a data transfer command from an external device. Instead, SIM (33) waits until it receives from the DCM (34) a valid response, known as a Command Acknowledge, before initializing the data transfer circuitry.

When SIM (33) receives a command from another FC device, typically a FCIB (37), SIM microprocessor (57) passes through any relevant commands to DCM (34). When a valid response such as a command acknowledgment is received from DCM (34), microprocessor (57) performs all necessary functions, and subsequently sends the response out on FC ports (56). When Disk Control Module (DCM) (34) issues a command to SIM (33), microprocessor (57) issues any required FC commands and then performs any required functions. Again, the balance of the logic, i.e., Bus Selector (60), Data Frame Buffer (61), etc. is configured to perform all data transfers with minimal intervention of microprocessor (57) after initial set-up is performed. SIM (33) and DCM (34) communicate with each other via a "mailbox" defined as a dedicated command storage area and located within microprocessor (57).

Figure 12:
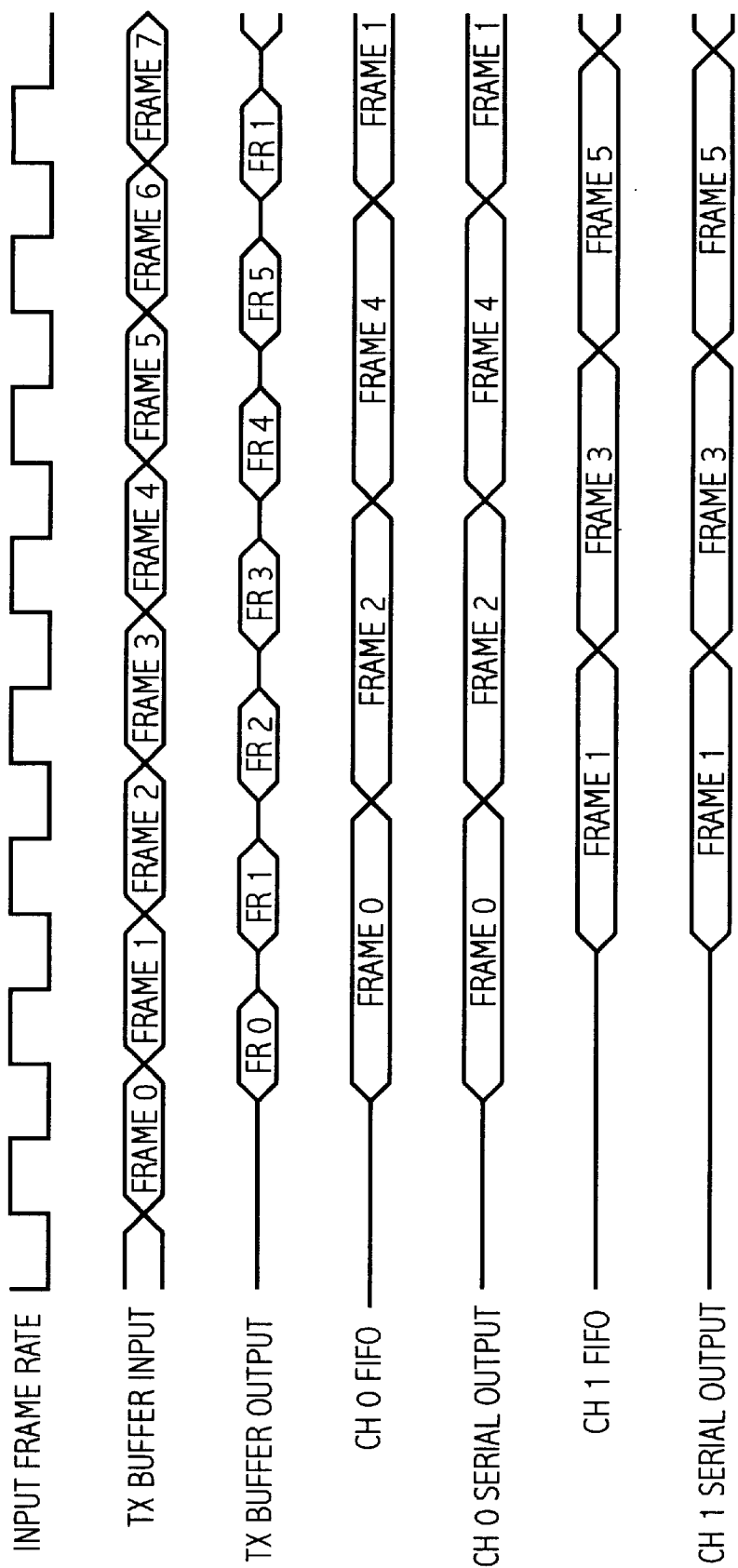
FIG. 12 is a timing diagram showing how data input to the FCIB from a data port such as a PCI interface is split or de-multiplexed into two or more frames for output from two to up to five parallel fiber channel ports.
Figure 13:
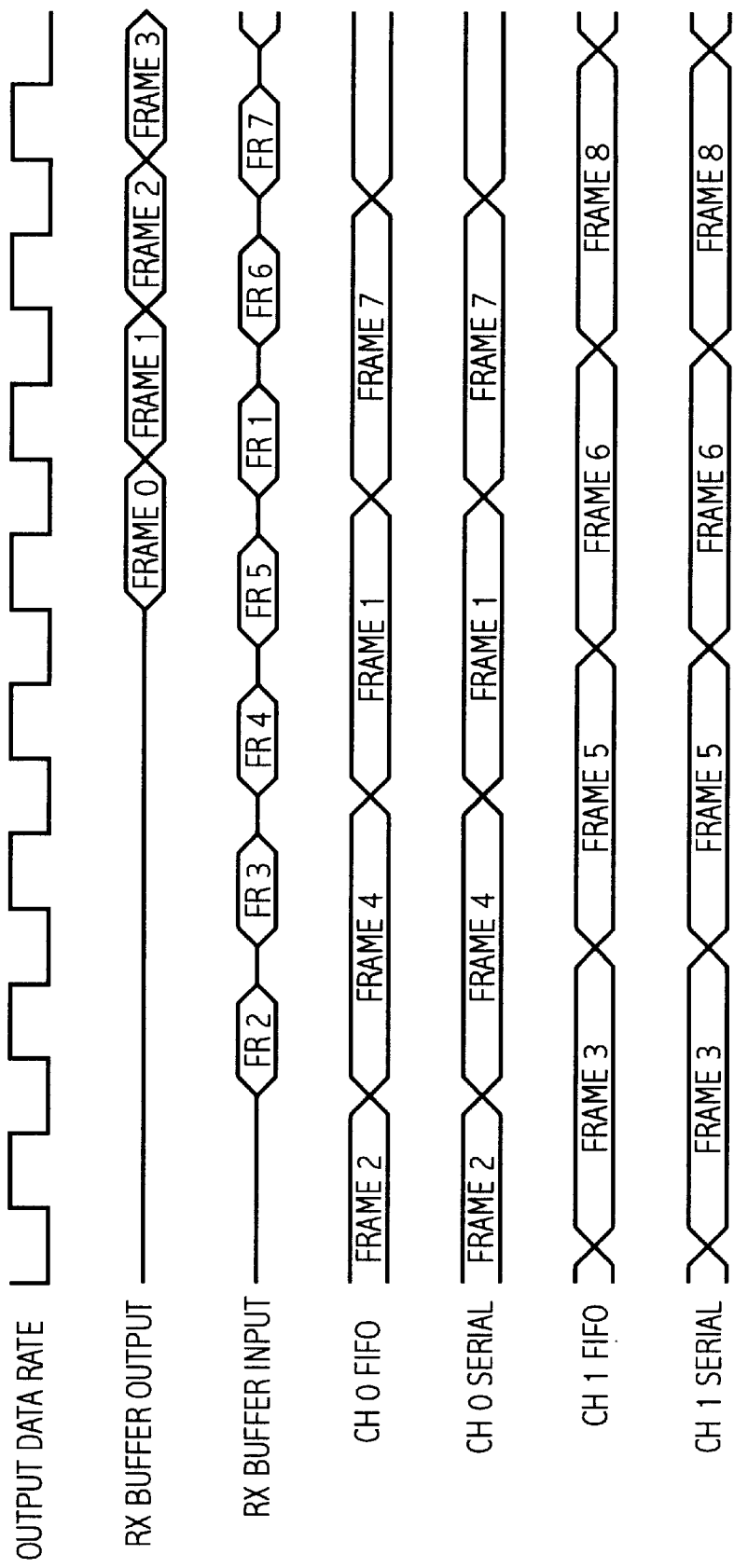
FIG. 13 is a timing diagram showing how the de-multiplexed data frames transmitted from the FCIB over a plurality of fiber channels and received by the SIM are multiplexed into a single 64-bit wide data stream by the SIM.

FIGS. 12 and 13 are timing diagrams illustrating how a plurality of parallel fiber channels are utilized to increase the rate of data transfer rate between FCIB (37) and SIM (33). According to the present invention, a plurality (N) of serial data channels, e.g., fibre channel cables (42), each having a maximum data transfer rate of P megabytes per second (MB/s) are utilized in a novel way to achieve the same system function accomplished by a single serial data channel having a maximum data transfer rate of Q=NxP MB/s. This data transfer rate acceleration is accomplished by using circuitry located in FCIB (37) or SIM (33) which employs a 1-to-N de-multiplexer that accepts a single 64-bit wide serial data stream, and formats and outputs that data through N parallel-to-serial converters to N separate, paralleled serial channels. The N separate serial channels are connected to N serial-to-parallel converters located in SIM (33) or FCIB (37), which output data to an N-to-1 Multiplexer, the output of which comprises a reconstructed 64-bit wide serial data stream. In the preferred embodiments of modular disk memory apparatus (30), up to five parallel fibre channels (42) are used to transmit data bi-directionally between FCIB (37) and SIM (33). However, for the purpose of simplifying the functional description of accelerated data transfer between the FCIB and SIM, FIGS. 12 and 13 illustrate the timing of data transfers employing only two of the five fibre channels.

Referring now to FIG. 12, it is assumed that each fibre channel (42) of a particular type can transmit a frame of data (2048 bytes) at an aggregate rate of 103 MB/s, i.e., 1 frame every 19.884 $\mu$sec. This frame rate is depicted in each of the last four rows of FIG. 12, and corresponds to two clock cycles of row 1 of FIG. 12, labeled Input Frame Rate. As shown in FIG. 12, the period between any two consecutive frames outputted on two parallel FCIB channels is equal to the aggregate frame period (19.884 $\mu$sec) divided by N, where N is the number of parallel channels, equal to two in the present example. Thus, as shown in the last four rows of FIG. 12, the period between consecutive transmitted frames is equal to two clock cycles divided by two equals one clock cycle of the input frame rate, row 1. Thus, in this example, the achieved data frame transfer rate is equal to the maximum serial data rate of any one serial channel, multiplied by N=2. In the example of FIG. 12, the receiver did not correctly receive Frame 1, which therefore was required to be re-transmitted.

FIG. 13 illustrates how data from a single serial channel accelerated into a plurality of N paralleled serial channels as depicted in FIG. 12 is concatenated, or assembled into a single serial data stream on a single serial channel.

For the example depicted in FIG. 13, data transmitted from FCIB (37) in the format shown in FIG. 12 is received by a SIM (33). In the example of FIG. 13, data is not taken out of the receive buffers (Rx) (61) until the [nx2+2] frame is being written into the Rx buffer. For the present example, with two serial channels, data will not be taken out of the Rx buffer (61) until the 6$^{th}$ frame is being written into the Rx buffer (61). The delay is necessary to ensure that data taken out of the Rx buffer (61) can be done so continually with no interruptions in data flow. In the present example, Frame 1 had to be retransmitted, hence, the out-of-order frame input to the Rx buffer (61).

The foregoing example described data transfer from FCIB (37) to SIM (33). However, FCIB (37) and SIM (33) are connected via a bi-directional data interface, and are exactly analogous in their functions. Thus, FIGS. 12 and 13 also depict data transfer from SIM (33) to FCIB (37).

Disk Control Module (DCM)

Figure 10:
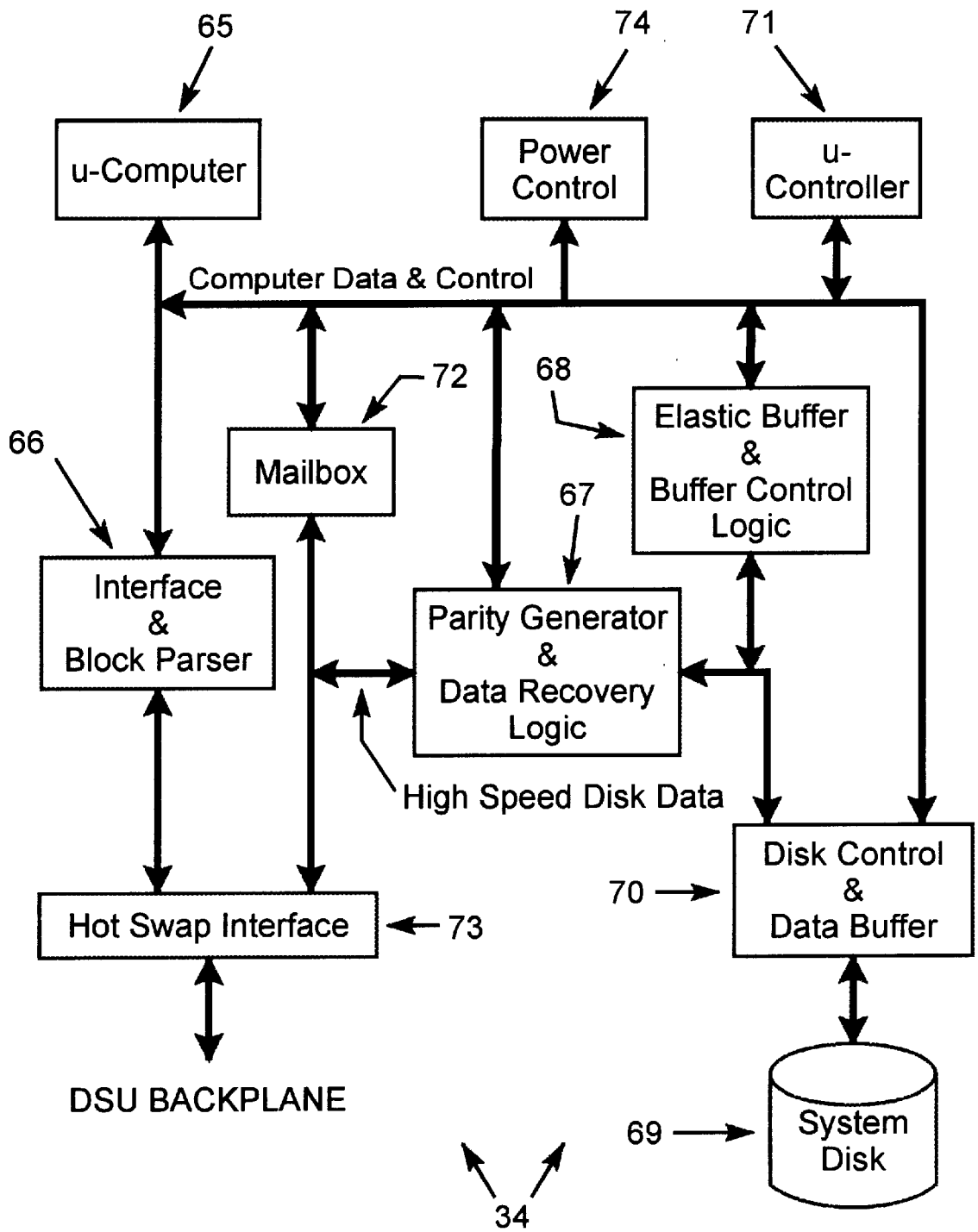
FIG. 10 is a block diagram of a Disk Control Module (DCM) comprising part of the apparatus of FIG. 4.

Disk Control Module (DCM) (34) is shown in block diagram form in FIG. 10. As shown in FIG. 3, DCM (34) is located in DSU (31), and is interconnected to System Interface Module (SIM) (33) and one or more Disk Storage Modules (DSM's) (35) via backplane wiring.

As shown in FIG. 10, DCM (34) has a microcomputer (65) that first sets up a directory for each file to be stored or written into DSU (31). Microcomputer (65) also initializes each DSM (35) in preparation for receipt of data. DCM (34) includes an Interface and Block Parser Control circuitry block (66) which controls the requested transfer of blocks of data from System Interface Module (SIM) (33) to each active Disk Storage Module (DSM) (35), one block at a time.

Figure 19:
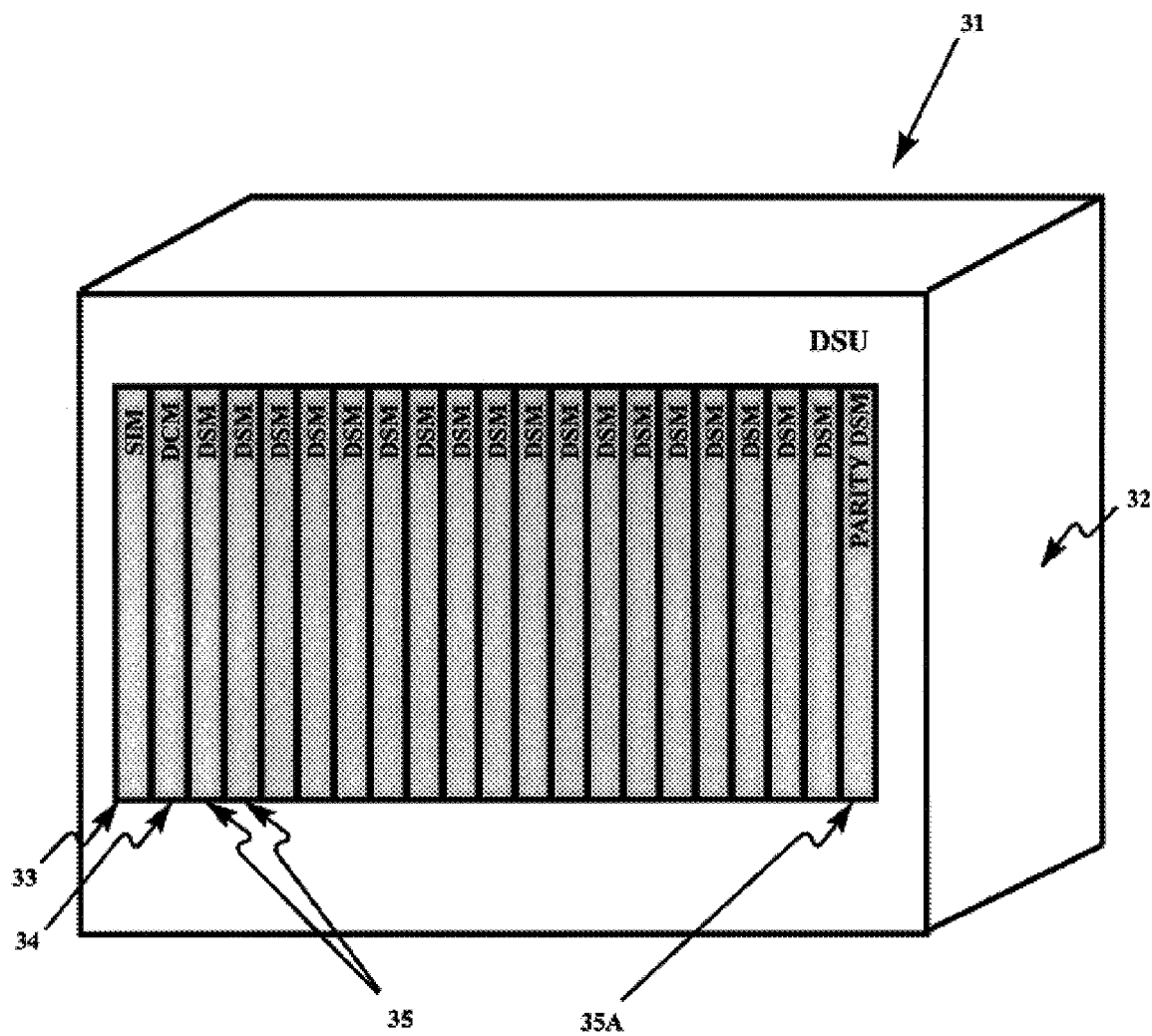
FIG. 19 is a perspective view similar to that of FIG. 18, but showing one DSM thereof dedicated to parity functions.

A Parity Generator and Data Recovery Logic circuitry block (67) in DCM (34) performs the function of monitoring the parity for each group of data blocks parsed by parser module (66) for writing to the DSM's (35). A block group consists of all of the data blocks parsed to the DSM's (35) until each hard disk (36) of each DSM has received a block, and the sequence starts over with the next group. After the last block in the group is parsed, the parity data in Parity Generator (67) is complete, and transferred to a memory storage space of adjustable capacity comprising part of an Elastic Buffer and Buffer Control Logic circuitry block (68). This parity data may be written into a System Disk Drive (69) via a Disk Control and Data Buffer circuitry block (70). System Disk Drive (69) may also contain instructions for operation of microcomputer (65) and Microcontroller and Serial Port circuitry block (71). The function of the Serial Port is to permit transfer of signals required for the manufacturing set-up and testing of each DCM module (34), and for performing remote diagnostics of the modules and system via a modem located at a customer's facility. The parity data stored in DCM System Disk Drive (69) may be used to reconstruct data lost from any one disk drive on a DSM (35). If, in addition, it is desired to provide additional protection against loss of data, a user may optionally install a special version of the DSM called a parity DSM (35A) in DSU (31) as shown in FIG. 19, dedicated entirely to parity information storage. With this configuration, information lost from any DSM (35) in DSU (31) may be regenerated by the dedicated parity DSM.

Referring still to FIG. 10, DCM (34) may be seen to include a Mailbox circuitry block (72), Hot Swap Interface circuitry block (73), and Power Control circuitry block (74). The function of the mailbox circuitry block is to provide means for communicating commands and data between DCM (34) and SIM (33). Hot Swap interface circuitry block (73) comprises an interface between DCM (34) and the DSM (35) or SIM (33) via backplane wiring (82), and provides means permitting removal and insertion of DSM modules without powering down the system by taking a DSM (35) offline and removing the module with DSU (31) still powered up. Power Control circuitry block (74) removes power from all non-essential logic circuitry and disk drives when the system is not transferring data, thereby conserving power.

When a file is being read from DSU (31), DCM microcomputer (65) first looks up the identification data for that file in the system directory located in the microcomputer's main memory, which is taken from and stored to the disk drive, and then initializes each active DSM (35) for a read operation. The DCM (34) then issues a request over the backplane to System Interface Module (SIM) (33) to initiate transfer of data blocks out of DSU (31). Block Parser (66) of DCM (34) then sequentially addresses a block of data from each active DSM (35) and directs these blocks to SIM (33). Each addressed DSM (35) in turn transfers its block of data across the level 3 (backplane) interface in response to the SIM (33) data transfer clock located in the bus selector (60). Blocks of data are continuously read until the entire file has been read.

If a Data Recovery Mode of DCM (34) is selected, a corresponding parity block is read from the DCM's System Disk Drive (69) simultaneously with the first block of a group being transferred from the first DSM (35). An accumulated parity value is calculated as each group block is read by Data Recovery Logic Module (67). If a bad block of data is detected, it is not output from the DSM. After the last block of a group is read, the accumulated parity value is equal to the regenerated bad data block. DCM (34) then transfers the re-created block to SIM (33), which in turn substitutes the re-created block for the data in the location of the bad block.

Disk Storage Module (DSM)

Figure 18:
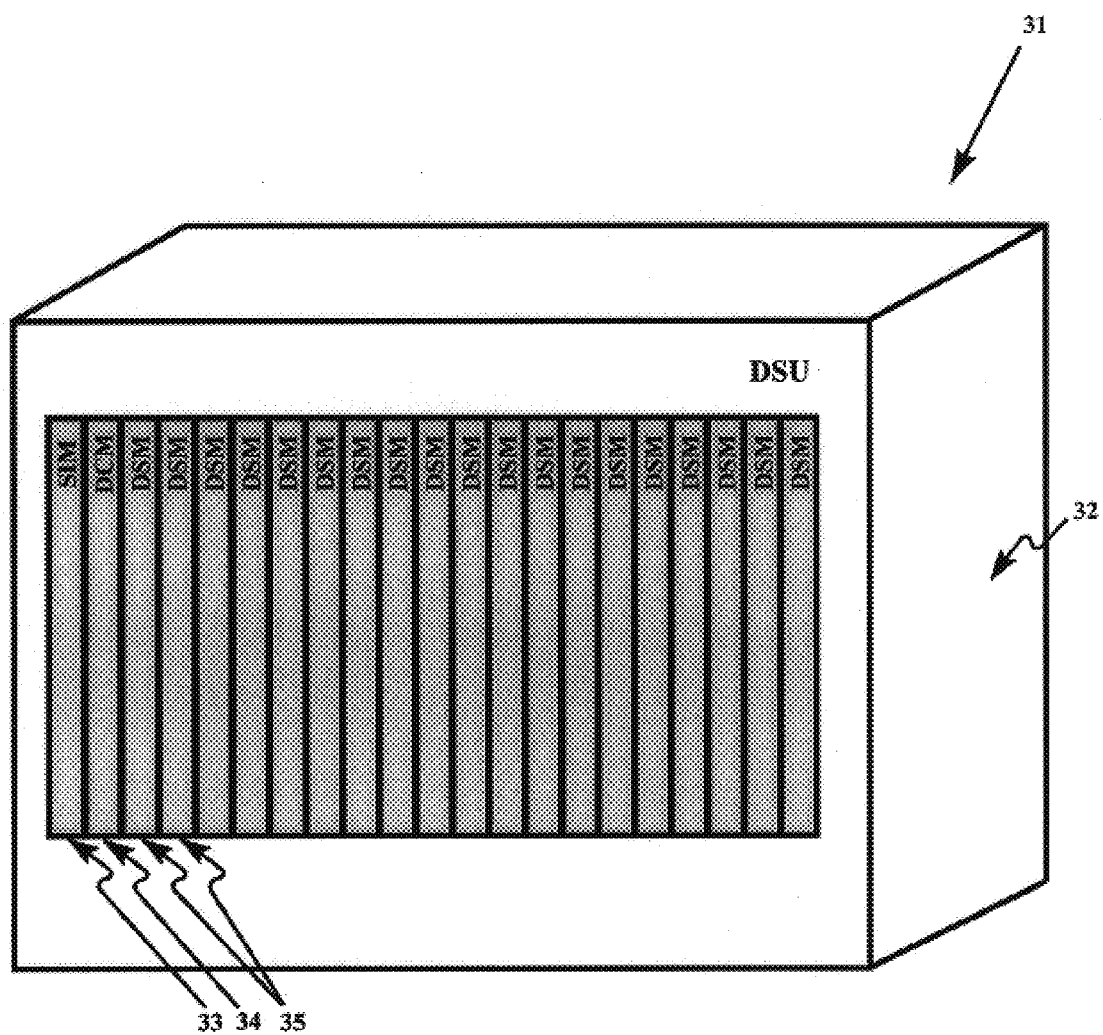
FIG. 18 is a perspective view of a fully populated DSU according to the present invention.

As shown in FIG. 18, DSU (31) may be constructed to accommodate up to 19 DSM's (35), rather then the maximum of three DSM's for the basic DSU embodiment of FIG. 4. The DSU (31) according to the present invention is constructed to permit each DSM (35) of the apparatus to be "hot-swappable," i.e., removable and replaceable within the DSU without powering down the system. Each DSM (35) added to DSU (31) increases both the real time data transfer speed and storage capacity of the DSU. Each DSM (35) is individually addressable by DCM (34) and responds to commands and issues status reports when properly addressed.

Figure 11:
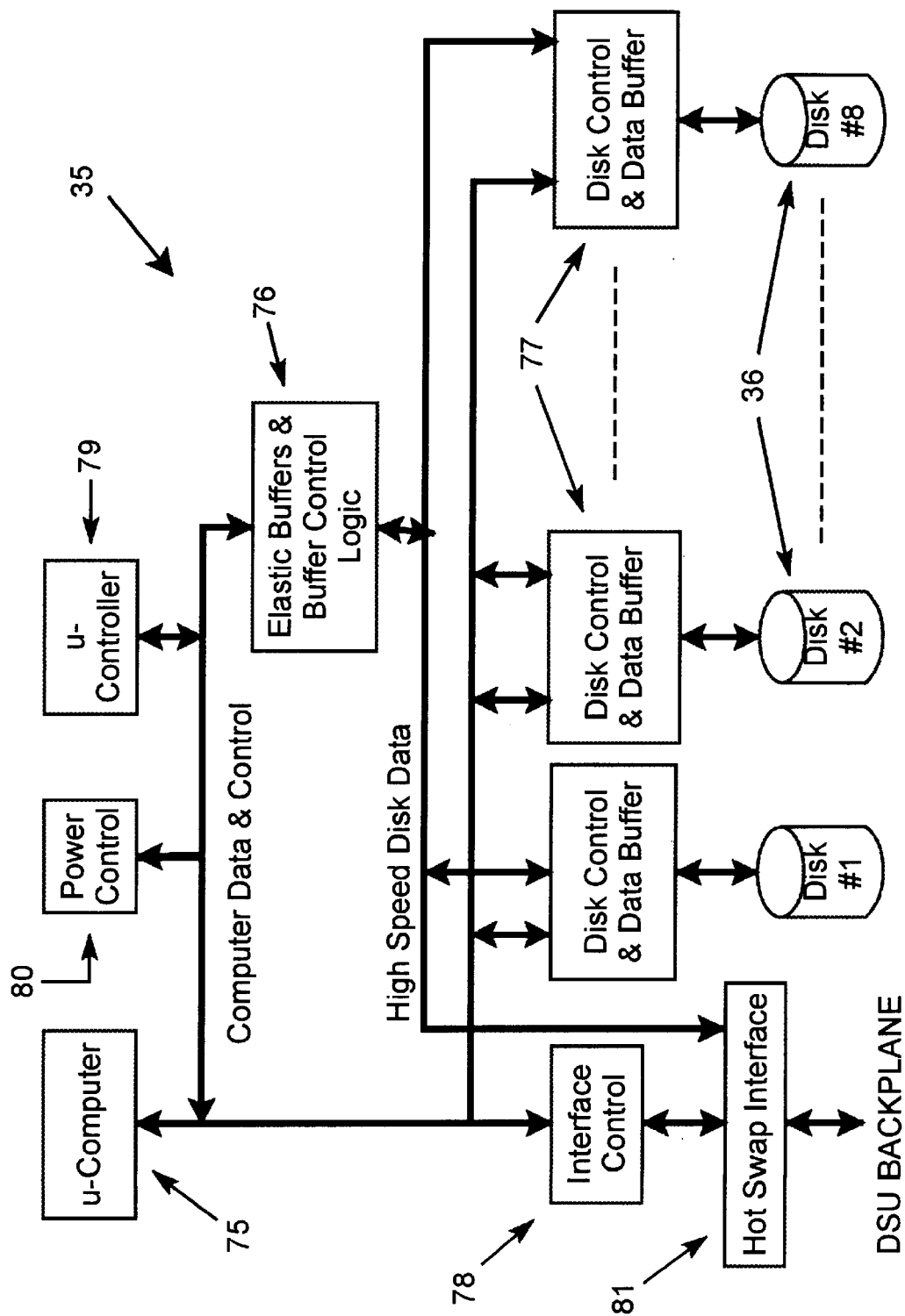
FIG. 11 is a block diagram of a Disk Storage Module (DSM) comprising part of the/apparatus of FIG. 4.

Referring now to FIG. 11, a simplified block diagram of a Disk Storage Module (DSM) (35) is shown. As shown in FIG. 11, DSM (35) has a microcomputer (75) which includes a microprocessor, static RAM, Boot Flash Memory, and associated control logic. The function of microcomputer (75) is to manage data block transfers into and out of an Elastic Buffer and Data Control Circuit Module (76) and through a plurality of Disk Control and Data Buffers (77), a separate one of which is connected to each miniature hard disk drive (36) on the DSM Microcomputer (75) also issues commands which set up each disk drive (36) before data transfer begins. In addition, microcomputer (75) monitors operation of DSM (35) recording in Main Memory (75) of the microcomputer and permanently storing on a disk drive (36) the location of bad block areas on each disk drive (36). Also recorded are detected module errors such as disk drive seek errors or unrecoverable data errors, diagnostic results from performing built-in test routines on various components of the DSM, and disk drive performance measurements, such as average transfer speed and hold off time.

DSM (35) has an Interface Control circuitry block (78) which includes an address decoder to determine which commands and data from the backplane of DSU (31) are intended for this module. Addresses, commands and data are placed on the backplane under the control of DCM (34).

During a data transfer operation all eight disk drives (36) of DSM (35) simultaneously transfer data to or from their respective Data Buffers (77). Elastic Buffers (76) located between Data Buffers (77) and the backplane of DSU (31) serve as an intermediate repository for data blocks. The term "elastic" here refers to the fact that the total memory storage area of the buffer can be partitioned, under control of microcomputer (75), into variable sizes for individual areas of disk drives (36), based on potentially different performance characteristics of the disk drives. In particular, a disk drive (36) could delay transferring data for extended periods of time because, of for example, poor data recovery requiring re-reads.

Data is transferred in blocks from each disk drive (36). A block could be defined as 8K bytes, for example. Since transfer of information from a disk drive (36) may be delayed or held off following receipt by DSM (35) of a read command, a buffer storage area, provided by Elastic Buffer (76) is required to assemble blocks of data as they become available from each individual disk drive. As data becomes available from each disk drive (36), it is stored in Elastic Buffer (76). Then, when Elastic Buffer (76) becomes full, actual data transfer from the DSM's (35) onto the backplane of DSU (31) is initiated. With this arrangement, even if data transfer from one or more disk drives (36) is delayed or held off for extended periods of time, blocks of data are available from the stockpile stored in Elastic Buffers (76).

The capacity of Elastic Buffers (76) is made large enough to ensure that the stockpile for each drive (36) has a high probability of never running out, even when data output from the drive is delayed or held off for extended periods of time, as measured by performance disk drive tests. Tests on a sample of disk drives give a high probability that hold off times don't exceed the elastic buffer size. The stockpile of data blocks for each drive (36) is continuously replenished because the system is configured to ensure that the average file transfer speed from each drive always exceeds the demand. During a write operation, data transfer into a DSM (35) is initiated with Elastic Buffers (76) empty. If a drive "holds off," in this case, not being ready to write data on the hard disk, blocks of data for that drive will be stockpiled in Elastic Buffers (76) until the drive can accept the data.

As shown in FIG. 11, DSM (35) includes a Micro Controller and Serial Port Module (79), which is used during the manufacture of DSU (31) to set-up and test each module and to perform remote board/system level diagnostics, such as disk drive data reliability tests. The serial port (79) is connected to the backplane of DSU (31), and can be accessed via the external serial port on DCM (34). An external modem connected to the serial port of the DCM can access any board in the system via the backplane and can pass the information listed above as well as perform diagnostics from a remote location.

As is also shown in FIG. 11, DSM (35) includes a Power Control circuitry block (79) and a Hot Swap Interface circuitry block (80). The latter provides interfacing to DCM (34) and SIM (33) via the backplane. Each of the modules are designed to be removable and insertable without powering down the system, thus the term "Hot Swap." Power Control circuitry block (79) is used to power down all non-essential logic circuitry, and the disk drives, when the system is not in use, to reduce energy system power consumption.

During transfer of data into or out of DSU (31), blocks of data are transferred in bursts into or out of each DSM (35) each time the particular DSM is addressed. Blocks of data are transferred sequentially to or from each of the eight disk drives (36) of each addressed DSM (35), via Elastic Buffers (76). Each DSM (35) is allotted a time period sufficient to perform internal data block transfers when it is not being addressed. DSU (31) is configured to allow each DSM (35) a fixed time to do internal processing no matter how many DSM's are on the DSU.

Figure 14:
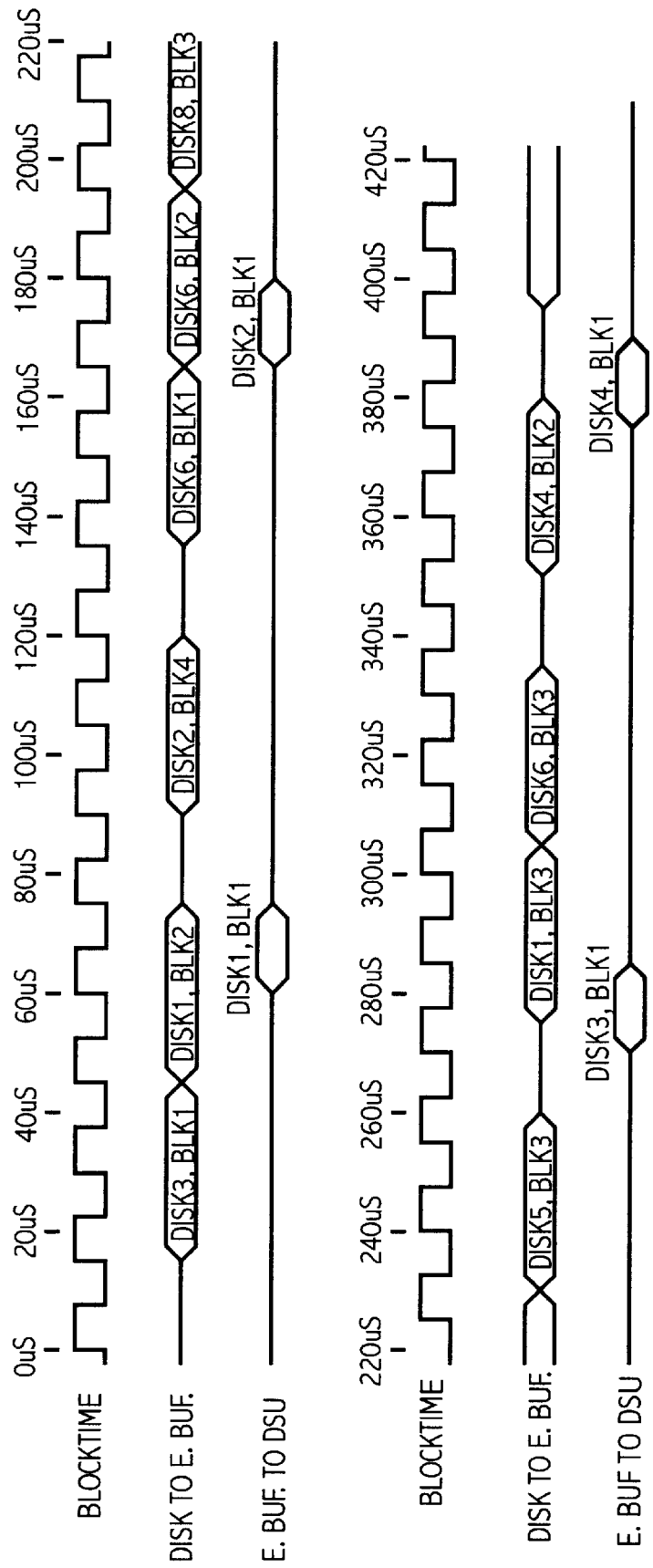
FIG. 14 is a timing diagram showing how data read from a plurality of disk drives on a single DSM is concatenated for placement on the DSU backplane.

FIG. 14 is a timing diagram for a read operation of a single DSM (35), showing the time sequence of blocks of data being read from a plurality of disk drives (36) to Elastic Buffers (76) and from the Elastic Buffers to the backplane (82) of DSU (31). The top row of FIG. 14 is a time scale, marked in 20-$\mu$sec increments. Rows two through four of FIG. 14 depict data transfers occurring during an interval 0 to about 220 $\mu$sec, while rows five through seven are a continuation of rows two through four, depicting events occurring during a time interval of about 220 $\mu$sec to about 420 $\mu$sec.

As shown in FIG. 14, blocks of data read from disk drives (36) are loaded into Elastic Buffers (76), via disk data buffers (77), in somewhat of a random sequence. Blocks of data are read in order from each disk drive (36), but which particular disk drive becomes available first may be random. However, for any particular disk drive (36), data block #1 always proceeds data block #2, and so forth. Also, blocks of data transferred out of Elastic buffers (76) are always parsed out in sequence, starting with disk #1, block #1, disk #2, block #1, ... disk #8, block #1, disk #1, block #2, and so forth until the end of a file is reached. As indicated in rows three and six of FIG. 14, there are spaces between the block transfers to the backplane of DSU (31) when other DSM's (35) are being sequentially addressed to put their respective blocks of data on the backplane bus. Thus, a file being read is assembled first of blocks parsed from consecutive DSM's (35), and secondarily from blocks on consecutive drives (36) within each DSM.

Figure 15:
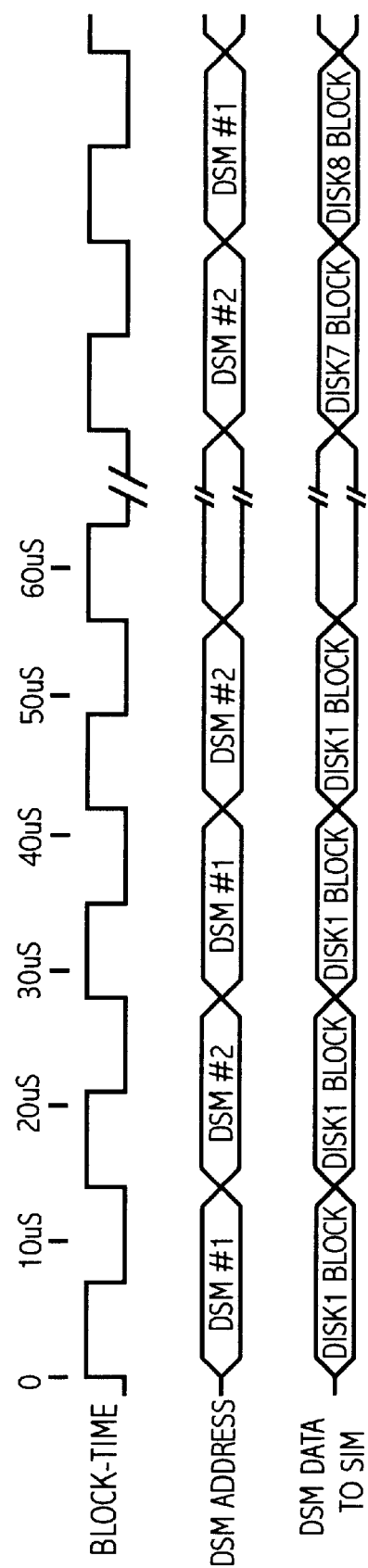
FIG. 15 is a timing diagram showing how data read from two DSM's is assembled for transmission to the SIM.
Figure 16:
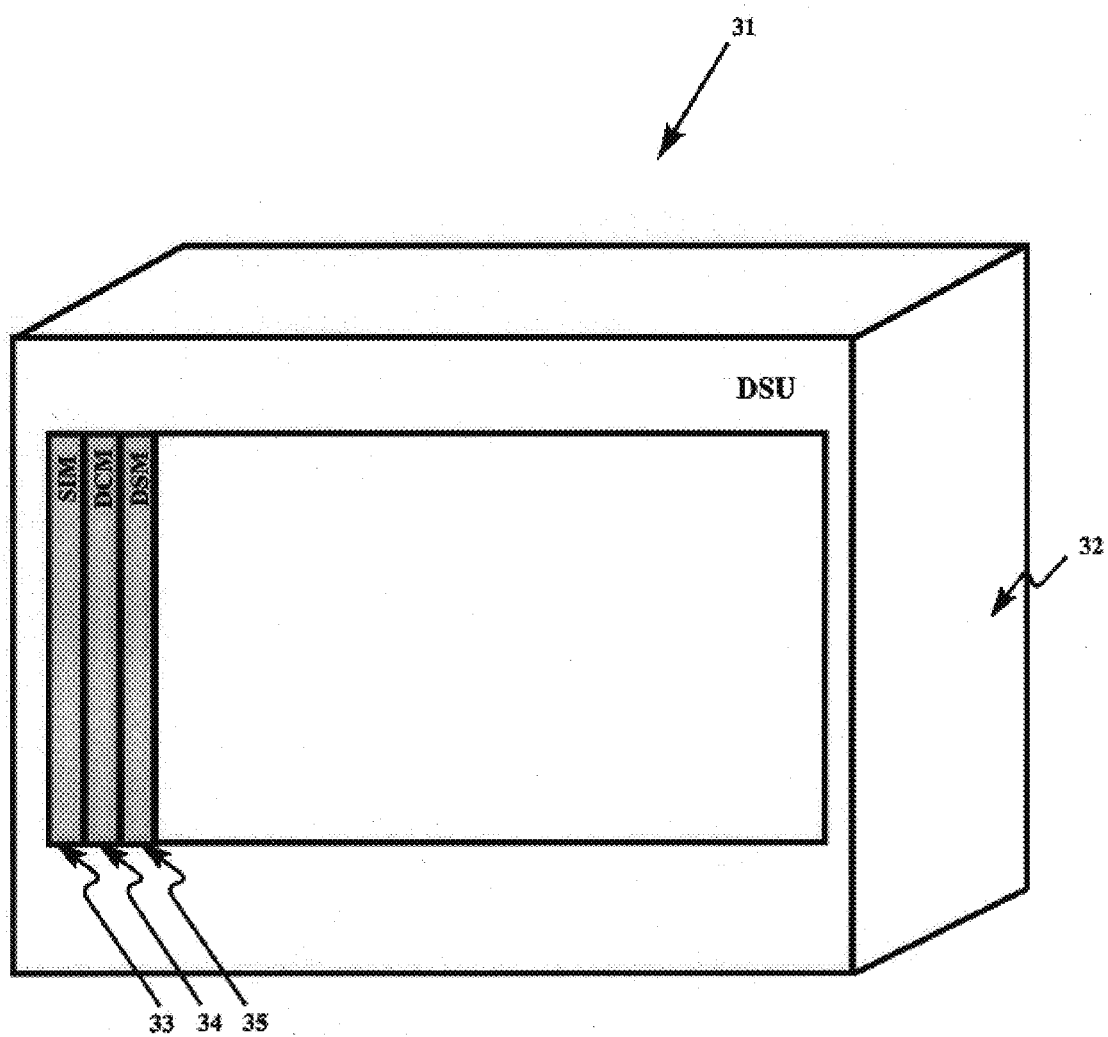
FIG. 16 is a perspective view of an expandable embodiment of a DSU according to the present invention.
Figure 17:
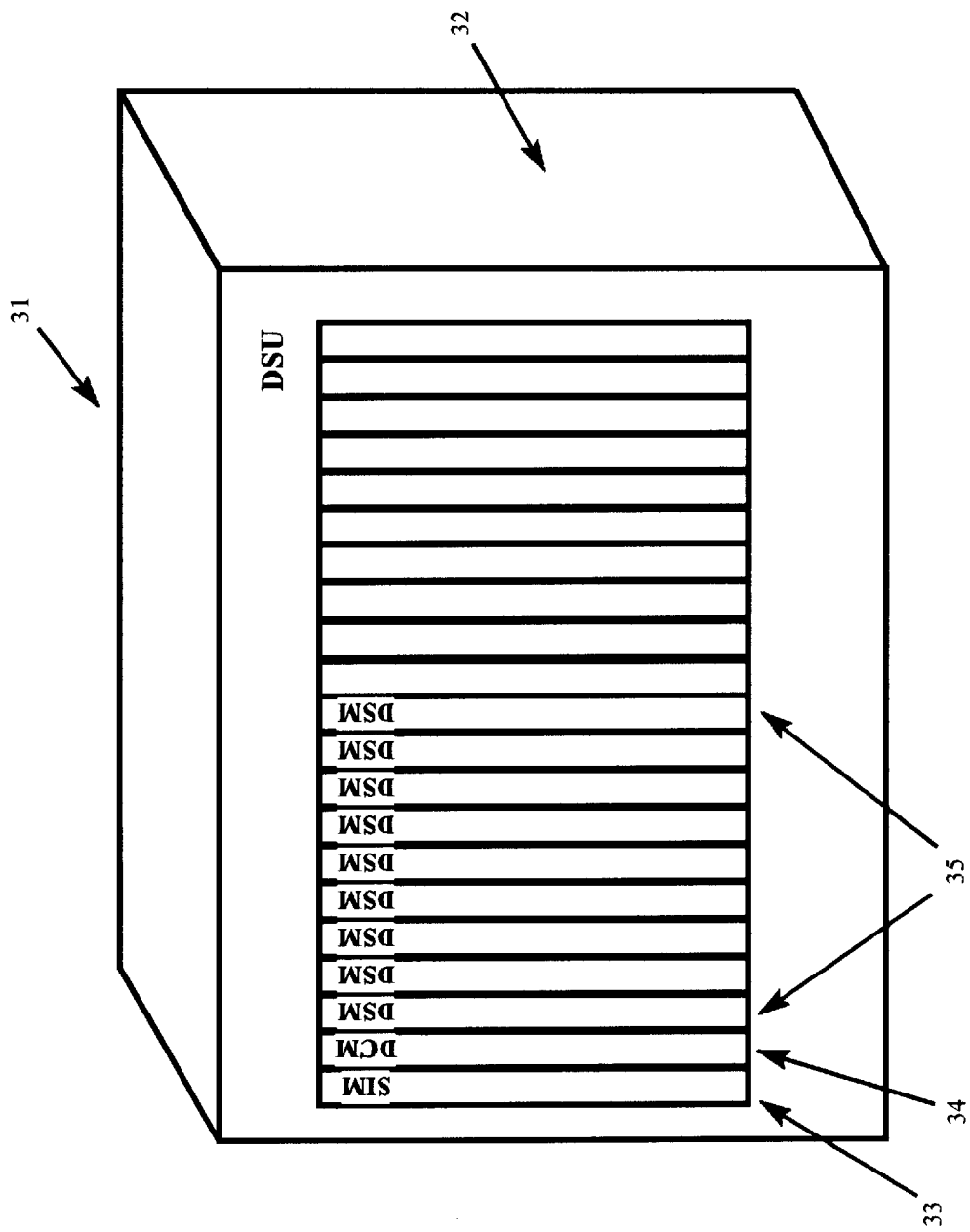
FIG. 17 is a perspective view similar to that of FIG. 16, but showing the DSU having a greater than minimal population of printed circuit boards.

FIG. 15 is a timing diagram showing how blocks of data are read from a DSU (31) having two DSM's (35). To initiate this data transfer, DCM (34) first initializes each of the two DSM's (35) to start transferring blocks of data from each disk drive (36) on the DSM into its respective Elastic Buffers (76). When Elastic Buffers (76) of each DSM (35) is full, DCM (34) signals SIM (33) to start the data transfer. DCM (34) then addresses the first DSM (35) containing the first block of data in the file being read. SIM (33) then starts clocking data from the addressed DSM (35). In the example shown in FIG. 15, this first DSM (35) happens to be DSM #1. Also, for this example, the file happens to start with a block of data from Elastic Buffers (76) of Disk Drive #1. When the block has been transferred to SIM (33), DCM (34) automatically addresses the next DSM (35) in line, which in the present example is DSM #2. DSU (31) has approximately 1% of timing overhead for all modules, which allows preparation for the next block transfer in a sequence of block transfers). DSM #2 then transfers its block of data from its Elastic Buffers (76), which data came from its corresponding disk drive #1. When that block has been transferred to SIM (33), DCM (34) automatically addresses the next DSM in line, which, in the present example, is DSM #1. DSM #1 then transfers its block from its Elastic Buffers (76), which data block came from its next disk drive, disk drive #2. If the file is long enough, the sequence of block transfers from Elastic Buffers (76) of DSM's (35) will progress to the last disk drive (36) of the last DSM, at which time the sequence will start over with the second block from the Elastic Buffers of the first DSM, containing data from the first disk drive of that DSM. As data is taken from the Elastic Buffers of each DSM, new data read from all eight disk drives is being stockpiled in the Elastic Buffers. Microcomputer (75) of each DSM (35) keeps track of time windows of opportunity to transfer blocks of data from the disk drive buffers (77) to the Elastic Buffers (76) without interrupting data flow from the Elastic Buffers to SIM (33).

In a fully loaded DSU (31) containing 19 DSM's (35), a data block is read in succession from each of the 19 DSM's, from all of their #1 disk drives, before reading data from the #2 disk drives. With 8 disk drives on each DSM, 152 disk drives are accessed before the next block of data from disk drive #1 of DSM #1 is required.

In an example embodiment of DSU (31), blocks of data are transmitted in bursts across the backplane of the DSU at a rate of 528 megabytes per second. Periods between block transfers will vary depending upon the number of DSM's in the system, and upon the required data transfer rate, but the DSU is so configured as to guarantee a minimum time period between block transfers to allow set-up of each DSM for the next block transfer. To improve overall system data transfer rate, files are always placed sequentially on the disk drives, as shown in the example of FIG. 15.

System Operation

A. Writing Data to DSU (31): The DCM sets up each DSM prior to the data transfer. The DSM in turn prepares each disk drive to start writing to its specified location on the disk. Data at the interface is 64 bits wide (8 bytes) and a single block of data is clocked in with 1024 cycles of a 66 MHz clock. The system design is such that there will be a dead time of at least 10 times this amount before the next data block is written to this DSM. Each input data block is written into the Elastic Buffer from where it will be transferred to the appropriate disk Data Buffer when that buffer is ready. The Interface Control Logic recognizes its module address as well as the address of a predecessor module in the chain of DSM's being parsed data. In this way, the microcomputer knows in advance to make the Elastic Buffer available when the next data block appears at the interface. The Disk Controller and Data Buffer associated with each disk drive are initialized by the microcomputer, but operate independently once started. Once the disk drive is set up to transfer to a specified location on the disk, the Disk Controller takes over and automatically transfers the specified number of blocks to the disk without microcomputer intervention.

B. Reading Data From the DSU: The DCM sets up each DSM prior to the data transfer. The DSM in turn prepares each disk drive to start reading from its specified location on the disk. Data blocks move from the disk to the disk Data Buffer and then to the Elastic Buffer. From there the block is transferred through the interface to the DSU Backplane. For applications requiring a guaranteed transfer rate, a sufficient number of DSM's must be installed so that the maximum demand from the interface is less than the data transfer rate capability of the disk drives. Thus, for long data transfers, the data buffers will eventually fill and the actual disk drive transfer rate would decrease so as to exactly match the demand. The Interface Control Logic recognizes its module address as well as the address of a predecessor module in the chain of DSM's supplying data blocks. In this way the microcomputer knows in advance to make a data block in the Elastic buffer available when requested via the interface.

The Disk Controller and Data Buffer associated with each disk drive are initialized by the microcomputer, but operate independently once started. Once the disk drive is set up to transfer from a specified location on the disk, the Disk Controller takes over and automatically transfers the specified number of blocks from the disk to its Data Buffer without microcomputer intervention.

The novel and advantageous method of data transfer according to the present invention may be better appreciated by examining how the data is reconstructed at the receiver. All other prior art systems reconstruct data based on either a known (and fixed) time delay between multiple channels, or a predefined interleaving technique that is repeated. The method according to the present invention involves embedding the reconstruction information in the data transferred so that the receiver can reconstruct the data regardless of how the transmitter interleaved the data and independently (within reasonable limits) of time differences between the various channels used in the transfer. This provides a transmission technique that is independent of the number (N) of channels used, and independent of the particular channels used. Note that the number of channels used (N) must meet or exceed the minimum number of channels required to provide a particular transfer rate.

For example if there are 5 channels (numbered 1–5) available and the transfer requires at least 2 channels, the transfer can take place using channels 1, 2 and 5. If channel 4 becomes available then channels 1, 2, 4, and 5 are used. If channel 1 is removed then channels 2, 4 and 5 are used. If channel 3 is added and channels 2 and 5 removed, the data transfer will use channels 3 and 4. All of this can be done during the data transfer without any loss of data, resynchronization of receiver buffers, or redefining the interleaving pattern.

Other novel and advantageous features of the present invention which distinguish it over the prior art include scalability and upgradability.

Scalability includes transfer rate and storage depth. Transfer rate can be increased by the addition of more Fibre Channel Ports (up to five) or more DMS's (up to 19). Storage depth can be scaled by the addition of more DSM's in a DSU (up to 19) or more DSU's in a system (up to 125).

Upgradability covers interfaces, transfer rate, storage depth, and microcode. The SIM can be changed/upgraded to include new communications schemes. As an example, we could develop a Gigabit Ethernet SIM and a customer could simply remove their old SIM and install the new Gigabit Ethernet Sim to upgrade their system. Adding more DSM's or installing a larger number of FC Ports (up to five) can increase transfer rate. Either adding more DSM's or increasing the number of DSU's in a system (up to 125) can increase storage depth. Finally, microcode can be downloaded to upgrade the system. Due to the large number of microcontrollers in the system, microcode can be downloaded and the system reprogrammed. Examples of this reprogramability might be to optimize a system for a particular application or environment.

What is claimed is:

1. An electronic memory apparatus adapted to provide digital data storage for a host device such as a computer, said apparatus providing high data transfer rates per unit volume of said apparatus and comprising;

a. at least one Data Storage Module (DSM) having mounted thereon a plurality of miniature disk drive memory units and associated electronic components and control circuitry, b. data communication means for conveying signals between said DSM and said host device, and c. a Disk Controller Module (DCM) for controlling bidirectional data flow between said DSM(s), and said host device, whereby data from said host device may be written into and read from said DSM's, said data communication means comprising in combination:

i. a Fibre Channel Interface Board (FCIB) adapted to be installed in said host device and providing a signal interface therewith, ii. a System Interface Module (SIM) providing a signal interface with said DSM(s), and iii. a data communication conduit adapted to convey bidirectional signals between said FCIB and said SIM, said data communication conduit comprising a plurality of p parallel serial data channels where p is an integer having a value greater then one.

2. The apparatus of claim 1 wherein said DCM is further defined as including a system hard disk drive for storing operating information for said apparatus, and parity information for data written into said DSM's.

3. The apparatus of claim 1 wherein said DSM is further defined as including a data bus affording means permitting bidirectional data transfer between said DSM and other components of said apparatus, and an elastic buffer interposed between said data bus and said hard disk drives, said elastic buffer comprising a temporary memory storage area of variable size, and providing means for assembling blocks of data read with various delay times from individual ones of said plurality of DSM hard disk drives into composite data blocks, and for parsing blocks of data for writing into individual ones of said hard disk drives as each becomes available.

4. The apparatus of claim 1 wherein said DSM is further defined as being of a standard size and format having a space accommodating a number m of hard disk drives, on which DSM are mounted a number n of smaller disk drives.

5. The apparatus of claim 4 wherein the ratio of n to m is at least 4.

6. The apparatus of claim 4 wherein m=2.

7. The apparatus of claim 4 wherein n=8.

8. An electronic memory apparatus adapted to provide digital data storage for a host device such as a computer, said apparatus providing high data transfer rates per unit volume of said apparatus and comprising:
  a. at least one Data Storage Module (DSM) having mounted thereon a plurality of miniature disk drive memory units and associated electronic components and control circuitry,
  b. data communication means for conveying signals between said DSM and said host device, and
  c. a Disk Controller Module (DCM) for controlling bidirectional data flow between said DSM(s), and said host device, whereby data from said host device may be written into and read from said DSM's, said data communication means comprising in combination:
    i. a Fibre Channel Interface Board (FCIB) adapted to be installed in said host device and providing a signal interface therewith,
    ii. a System Interface Module (SIM) providing a signal interface with said DSM(s), and
    iii. a data communication conduit adapted to convey bidirectional signals between said FCIB and said SIM, said data communication conduit comprising a plurality of p parallel serial data channels where p is an integer having a value greater then one, said FCIB including a data frame multiplexer/demultiplexer which affords means for demultiplexing or parsing data from a parallel data channel of said host device or an external device connected thereto, through a plurality of fibre channel ports of said FCIB over said plurality of parallel serial data transmission channels in a transmit mode, and means for multiplexing or concatenating data received over said plurality of parallel serial data communication channels into said parallel data channel of said host device or external device, in a receive mode.

9. The apparatus of claim 8 wherein said SIM is further defined as including a data frame multiplexer/demultiplexer which affords means for demultiplexing or parsing data from a parallel data channel of said apparatus for transmission through a plurality of SIM bidirectional ports over said plurality of paralleled serial data communication channels, in a transmission mode, and means for multiplexing or concatenating data received over said plurality of paralleled serial data communication channels onto a parallel data channel of said apparatus, in a receive mode.

10. The apparatus of claim 9 wherein said FCIB ports are coupled to said SIM ports via said plurality of parallel serial data communication channels.

11. The apparatus of claim 10 further including means for embedding reconstruction information within interleaved data demultiplexed for transmission over said plurality of data transmission channels, and means responsive to said embedded data in reconstructing said interleaved data in spite of the number of said data transmission channels and variations of transmission times therebetween.

12. A modular disk memory apparatus adapted for use with a host device such as a computer, and providing high sustained data transfer rates between said device and said apparatus, said apparatus comprising:
  a. a Data Storage Unit (DSU), said DSU comprising,
    i. at least one Disk Storage Module (DSM) including a circuit board having mounted thereon a plurality n of miniature disk drive memories and associated electronic components and control circuitry, said circuit board being of a size adapted to hold a plurality of m disk drives of larger size than said miniature disk drives,
    ii. a Disk Control Module (DCM) for controlling and transmitting data to, and receiving data from said DSM(s), and
  b. data communication means for conveying signals between said DSU and said host device, said data communication means for conveying signals between said DSU and said host device comprising in combination:
    i. a Systems Interface Module (SIM) for receiving data from said DSM's and formatting said data for transmission to said host device, and for receiving data from said host device and formatting said data for transmission to said DSM's,
    ii. a Fibre Channel Interface Board (FCIB) adapted to be installed in said host device and providing means for receiving data from said SIM and formatting said data for use by said host device and for receiving data from said host device and formatting said data for transmission to said SIM, and
    iii. a data communication conduit adapted to convey bidirectional signals between said SIM and said FCIB, said data communication conduit comprising a plurality of p paralleled serial data channels where p is an integer having a value greater than one.

13. A modular disk memory apparatus adapted for use with a host device such as a computer, and providing high sustained data transfer rates between said device and said apparatus, said apparatus comprising:
  a. a Data Storage Unit (DSU), said DSU comprising,
    i. at least one Disk Storage Module (DSM) including a circuit board having mounted thereon a plurality n of miniature disk drive memories and associated electronic components and control circuitry, said circuit board being of a size adapted to hold a plurality of m disk drives of larger size than said miniature disk drives,
    ii. a Disk Control Module (DCM) for controlling and transmitting data to, and receiving data from said DSM(s), and
  b. data communication means for conveying signals between said DSU and said host device, said data communication means for conveying signals between said DSU and said host device comprising in combination;

i. a Systems Interface Module (SIM) for receiving data from said DSM's and formatting said data for transmission to said host device, and for receiving data from said host device and formatting said data for transmission to said DSM's, ii. a Fibre Channel Interface Board (FCIB) adapted to be installed in said host device and providing means for receiving data from said SIM and formatting said data for use by said host device and for receiving data from said host device and formatting said data for transmission to said SIM, and iii. a data communication conduit adapted to convey bidirectional signals between said SIM and said FCIB, said data communication conduit comprising a plurality of p paralleled serial data channels where p is an integer having a value of at least one, said SIM including a data frame multiplexer/demultiplexer which affords means for demultiplexing or parsing data from a parallel data channel of said apparatus for transmission through a plurality of SIM bidirectional ports over said plurality of paralleled serial data communication channels, in a transmission mode, and means for multiplexing or concatenating data received over said plurality of parallel data communication channels onto said parallel data channel of said apparatus, in a receive mode.

14. The apparatus of claim 13 wherein said FCIB is further defined as including a data frame multiplexer/demultiplexer which affords means for demultiplexing or parsing data from a parallel data channel of said host device for transmission through a plurality of FCIB fiber channel ports over said plurality of paralleled serial data transmission channels in a transmit mode, and means for multiplexing or concatenating data received over said plurality of parallel data communication channels onto said parallel data channel of said host computer, in a receive mode.

15. The apparatus of claim 14 wherein the number of said p channels used for transmission may be varied under control of the user of a host device to a value of q where q is an integer lying between 1 and p, inclusive.

16. The apparatus of claim 15 wherein said value of q is recognized by SIM in said DSU, which configures said SIM to receive q channels of data.

17. A modular disk memory apparatus for providing high capacity, high data transfer rate, data storage capability to a computer or other electronic host device, said apparatus having a WRITE mode affording means for storing data from said host device or an external device in said apparatus, and having a READ mode affording means for retrieving said stored data by said host or external device, said apparatus comprising:

a. a modular Data Storage Unit (DSU), said DSU comprising, i. a housing including plug-in connector means adapted to receive and make electrical connection with a plurality of circuit modules, each including electrical components mounted on a printed circuit board, power supply means for providing electrical power to said circuit modules, interface means for interfacing said DSU with said host device, and back plane electrical connection means for electrically interconnecting said circuit modules, said power supply means, and said interface means, ii. at least one and preferably a plurality of Disk Storage Module (DSM's) having mounted thereon a plurality n of miniature disk drive memories, said printed circuit board thereof being of a size adapted to hold a plurality of m larger disk drives, iii. a Disk Control Module (DCM) for controlling data written to and read from each of said DSM's, and b. data communication means for conveying signals bidirectionally between said DSU and said host device, said DCM including a system hard disk drive for storing system operation information for said apparatus, and parity information for data written into said DSM's, said data communication means comprising in combination i. a Fibre Channel Interface Board (FCIB) adapted to be installed in said host device and providing a signal interface therewith, ii. a System Interface Module (SIM) providing a signal interface with said DSM(s), and iii. a data communication conduit adapted to convey bidirectional signals between said FCIB and said SIM, said data communication conduit comprising a plurality of p parallel serial data channels where p is an integer having a value greater then one.

18. The apparatus of claim 17 further including means permitting removal of a single one of said plurality of DSM's from said housing of said apparatus during a WRITE or READ mode, said means comprising in combination a hot swap interface to said back plane and a parity DSM, operating in parallel with DSM's used for data storage, said parity DSM supplying on demand data contained on said removed DSM.

19. The apparatus of claim 17 wherein said System Interface Module (SIM) is further defined as providing means for receiving data from said DSM's and formatting said data for transmission to said host device, and for receiving data from said host device and formatting said data for transmission to said DMS's.

20. The apparatus of claim 19 wherein said Fibre Channel Interface Board (FCIB) adapted to be installed in said host device is further defined as providing means for receiving data from said SIM and formatting said data for use by said host device, and for receiving data from said host device and formatting said data for transmission to said SIM.

* * * * *